(12) United States Patent
Jarisch et al.

(10) Patent No.: US 10,334,980 B2
(45) Date of Patent: Jul. 2, 2019

(54) MOBILE BEVERAGE DISPENSING MACHINE AND METHOD FOR PREPARING A BEVERAGE

(71) Applicant: Nestec S. A., Vevey (CH)

(72) Inventors: Christian Jarisch, Lutry (CH); Nicolas Camier, Brignais (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/738,352

(22) PCT Filed: Jun. 28, 2016

(86) PCT No.: PCT/EP2016/064963
§ 371 (c)(1),
(2) Date: Dec. 20, 2017

(87) PCT Pub. No.: WO2017/001381
PCT Pub. Date: Jan. 5, 2017

(65) Prior Publication Data
US 2018/0177327 A1 Jun. 28, 2018

(30) Foreign Application Priority Data
Jul. 2, 2015 (EP) .................................. 15174925

(51) Int. Cl.
| A47J 31/32 | (2006.01) |
| A47J 31/36 | (2006.01) |
| A47J 31/24 | (2006.01) |
| A47J 31/46 | (2006.01) |
| A47J 31/00 | (2006.01) |

(52) U.S. Cl.
CPC ............. *A47J 31/32* (2013.01); *A47J 31/005* (2013.01); *A47J 31/36* (2013.01); *A47J 31/46* (2013.01); *A47J 31/462* (2013.01); *A47J 31/24* (2013.01)

(58) Field of Classification Search
CPC ............. A47J 31/32; A47J 31/36; A47J 31/24
USPC ........................ 99/300, 302 R, 307, 280, 281
See application file for complete search history.

(56) References Cited

U.S. PATENT DOCUMENTS

| 8,387,516 | B1 | 3/2013 | Reynolds | |
| 9,192,260 | B2 * | 11/2015 | Glucksman | ............. A47J 31/32 |
| 2005/0126401 | A1 * | 6/2005 | Streeter | ................... A47J 31/32 |
| | | | | 99/279 |
| 2012/0125205 | A1 * | 5/2012 | Glucksman | ............. A47J 31/32 |
| | | | | 99/302 R |

FOREIGN PATENT DOCUMENTS

| WO | 2006102980 A1 | 10/2006 |
| WO | 2015073732 A1 | 5/2015 |

OTHER PUBLICATIONS

International Search Report in PCT/EP2016/064963 dated Sep. 30, 2016, filed Jun. 28, 2016.
Written Opinion of the International Searching Authority in PCT/EP2016/064963 dated Sep. 30, 2016, filed Jun. 28, 2016.

* cited by examiner

*Primary Examiner* — Reginald Alexander
(74) *Attorney, Agent, or Firm* — Dunlap Codding, P.C.

(57) ABSTRACT

A mobile beverage dispensing machine is disclosed that includes a liquid tank, a beverage preparation unit, a fluid circuit, and/or heating means. The machine may further include a mobile power source. Also disclosed are methods of preparing and using the mobile beverage dispensing machine.

19 Claims, 22 Drawing Sheets

MOBILE BEVERAGE DISPENSING MACHINE AND METHOD FOR PREPARING A BEVERAGE

CROSS-REFERENCE TO RELATED APPLICATIONS/INCORPORATION BY REFERENCE STATEMENT

This application is a US national stage application filed under 35 USC § 371 of International Application No. PCT/EP2016/064931, filed Jun. 28, 2016; which claims priority to EP App No. 15174924.9, filed Jul. 2, 2015. The entire contents of the above-referenced patent applications are hereby expressly incorporated herein by reference.

TECHNICAL FIELD

The present disclosure relates to a mobile beverage dispensing machine for preparing and dispensing a heated or hot beverage. In particular, the present disclosure relates to an improved mobile beverage dispensing machine comprising a liquid tank for receiving the liquid used for preparing the beverage, a beverage preparation unit for preparing a beverage using the liquid and dispensing the prepared beverage, a fluid circuit for delivering the liquid from the tank to the beverage preparation unit, and heating means for heating the liquid in the tank.

BACKGROUND

CN104138212 relates to a boiler for coffee maker having separating part arranged on water storage cavity that is arranged on fast heating area, an electric heating component arranged with a fast water heating area and a slow heating area formed with water hole.

WO 2005/053489 relates to a mobile apparatus for preparing beverages comprising a module for delivering a beverage by supplying a pressurized liquid, a liquid feed tank of sufficient capacity for supplying the module with several volumes of liquid for repeatedly supplying more than one beverage, gas-type pressurizing means suitable for supplying the module with pressurized liquid, a liquid feed chamber, of which the capacity is several times smaller than the capacity of the tank; said chamber being arranged, in a filling configuration, to communicate with the tank in order to be filled with liquid and, said chamber being arranged to communicate with the pressurizing means in order to pressurize the liquid in the chamber with gas and to inject pressurized liquid into the module and thereby permit delivery of the liquid through the module.

Mobile beverage dispensing machines are well-known in the prior art. These machines typically use bulky and heavy batteries to provide the same function as a standard electrical appliance connected to the mains supply. Heating the liquid (i.e., typically water taken from the tap or a bottle) inside such mobile beverage dispensing machines from fresh temperature (e.g., 6-10° C.) to a satisfactory beverage preparation temperature (e.g. 90-95° C.) requires a lot of energy thereby resulting in high power consumption. This, in turn, results in a reduced use time of the machine which in turn limits their extensive use in practice.

WO 2006/102980 relates to a standalone drink dispensing machine for delivering a drink by extraction under pressure comprising an extraction module, a water reservoir, a pump, an electrical power supply means for heating the water in the reservoir; the electrical power supply means comprising a low voltage electrical accumulator associated with the machine and configured to supply the pump with electrical current; and the reservoir means comprising heating means having a first electrical element powdered by the accumulator and a second electrical element, independent from the first element able to be powered by the mains in order to heat up water up to the reserve temperature.

The present disclosure seeks to address the above-described problems. One non-limiting object is to improve a beverage machine and its performance for mobile applications. Another more particular (but non-limiting) object is to reduce the energy consumption necessary to maintain liquid sufficiently hot during the energy autonomous mode of the machine. The present disclosure also aims at other objects and particularly the solution of other problems as will appear in the rest of the present description.

BRIEF DESCRIPTION OF THE DRAWINGS

Further features, advantages and objects of the present disclosure will become apparent for a skilled person when reading the following detailed description of embodiments of the present disclosure, when taken in conjunction with the figures of the enclosed drawings.

Figure 1A:
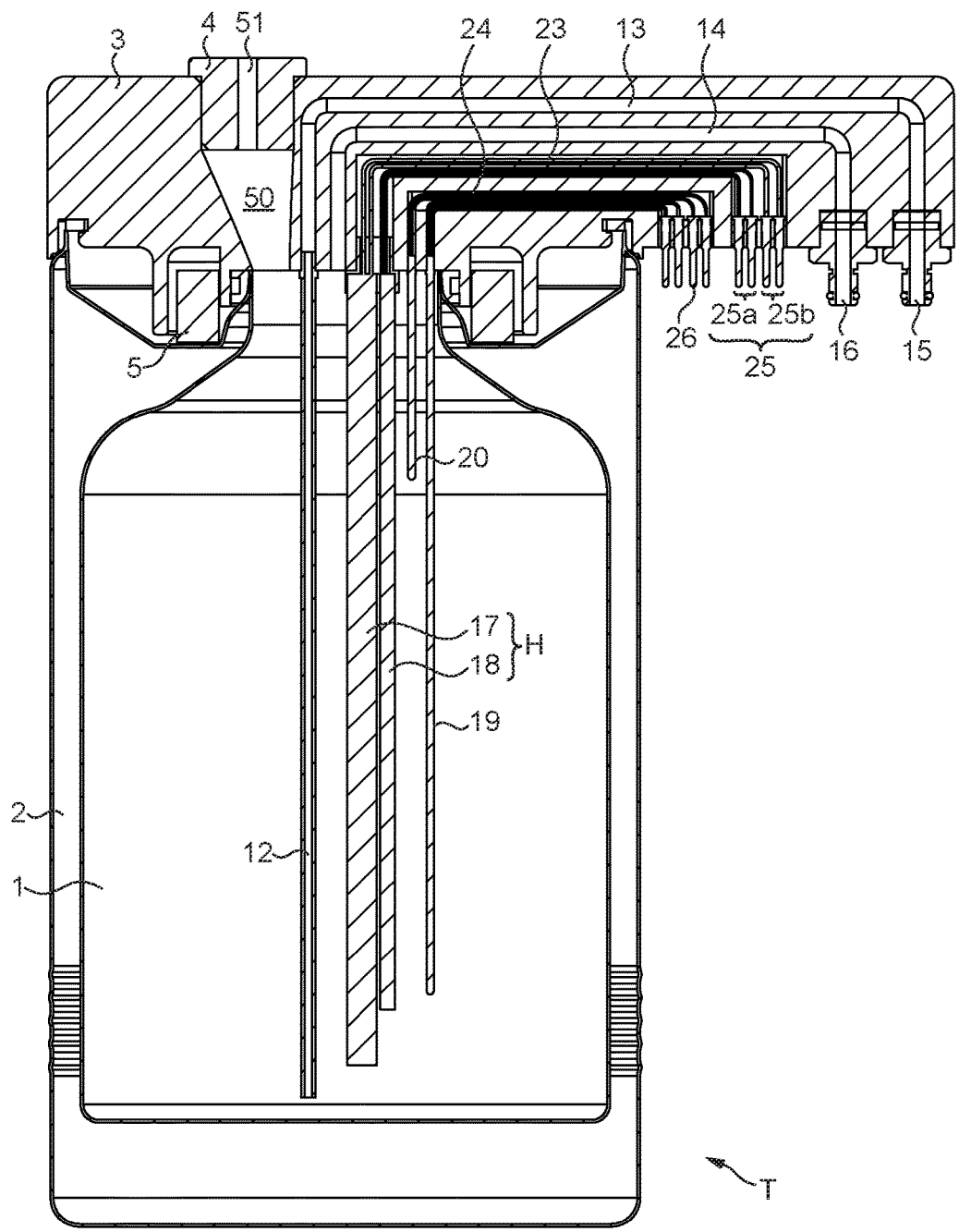
FIG. 1 (a-c) shows a mobile liquid tank according to a first embodiment of the present disclosure.

In the figures, (a) shows a cross section of the respective device/system/machine, (b) shows a perspective view of the respective device/system/machine and (c) shows a side view of the respective device/system/machine indicating the intersection line of (a).

DETAILED DESCRIPTION

One non-limiting embodiment of the present disclosure is defined by independent claim 1. The dependent claims define other characteristics of certain non-limiting embodiments of the present disclosure.

In a first non-limiting aspect the present disclosure relates to a mobile beverage dispensing machine comprising a liquid tank having an insulated tank body for receiving and storing a liquid used for preparing a beverage, a beverage preparation unit using the liquid and dispensing the prepared beverage, a fluid circuit for delivering the liquid from the tank to the beverage preparation unit, and heating means for heating the liquid in the tank. The machine further comprises a main power supply connector connectable to an external power source for operating the heating means, and at least one mobile power source for operating the heating means. The mobile power source can be a battery, such as (but not limited, to) a battery for operating the machine. Two mobile power sources may be provided; one of which is detachable with the tank from the machine to be recharged more conveniently. The machine further comprise at least one control unit configured to control and operate the heating means by external electrical power to heat up the liquid in the tank when the machine is supplied in electrical power by the main power supply connector connected to an external power source, and to control and operate the heating means by power of the at least one mobile power source to keep heating liquid in the tank when the machine is no longer supplied in electrical power from the at least one main power supply connector.

In certain non-limiting embodiments, the control unit is configured to substantially keep constant the temperature of the heated liquid in the tank when the machine is no longer supplied (or is stopped being) in electrical power from the at least one main power supply connector.

According to the present disclosure, the high power consumption for liquid heating is shifted out of the mobile machine, i.e. its mobile power source. The liquid in the tank can thus be easily heated up to a predetermined temperature by using an external power source, e.g. by plugging the heating means of the tank to main power. Once the liquid is heated, a mobile power source of the machine—which can also be integrated into the liquid tank—can take over the temperature control (i.e. keeping the temperature constant) at least once the external power supply is terminated. As the required power for keeping the temperature constant is much less than the power needed for heating up the liquid, the mobile power source can be laid out much smaller so that the overall weight and costs of the machine can be reduced while still having an increased operating time.

The heating means can comprise a first heating element and a second heating element, wherein the first heating element is connectable or connected to the main power supply connector and the second heating element is connectable or connected to the mobile power source. By using different heating elements for the respective power supply, the machine can be simplified and less power is needed for just keeping the temperature constant since the corresponding heating element can be laid out smaller than the heating element for heating up the liquid using external power.

The present disclosure describes different embodiments of mobile machines using corresponding tanks and a fluid circuit. The specific embodiments are designed for an optimized operation of a mobile machine in terms of quality, battery consumption and operating time.

In certain non-limiting embodiments, the fluid circuit comprises a first fluid path fluidly connecting the tank, such as (but not limited to) at its bottom, with the preparation dispensing unit, and the fluid circuit further comprises an air pump; at least one control unit being configured for actuating the air pump to fill air inside the tank. In certain non-limiting embodiments, the machine further comprises a first control valve activated by the control unit to fluidly connect the air pump to a first portion of first fluid path. The first control valve is also configured to close a second portion of the first fluid path to the beverage preparation unit while simultaneously fluidly connecting the air pump to the first fluid path.

As a result, the liquid temperature in the tank can be homogenized by air creating turbulence inside the tank during heating. Furthermore, most of the fluid path (or conduit) connected to the tank can be pressurized by air rather than with liquid. The electrical autonomy of the machine for producing beverage (e.g., coffee) at an effective/satisfying temperature can be dramatically increased by reducing the heat loss caused by liquid cooling down in the fluid path.

The fluid circuit comprises a second fluid path fluidly connecting the tank, such as (but not limited to) at its top, with ambient air at a certain overpressure above atmospheric pressure in the tank, wherein in certain non-limiting embodiments, the second fluid path comprises a check valve opening at a calibrated pressure value above atmospheric pressure, such as (but not limited to) above 1 bar, or at about 1.8 bar. As a result, the pressure within the tank can be maintained low to prevent damage and/or risk of hot liquid jetting outside in particular when the user removes the tank from the machine, such as for recharging the power source and/or exchanging the tank.

The first fluid path and/or the second fluid path can be connected with a third fluid path. This configuration enables to equilibrate the pressure through the first and second fluid paths and within the tank, in particular after extraction thereby essentially eliminating the liquid column and consequently significantly reducing the temperature losses in the tank.

In case the third fluid path connects both the first and second fluid path, the fluid circuit further comprises the first control valve, which in certain non-limiting embodiments is controlled by the control unit, for selectively closing the first fluid path such that the connection between (the bottom of) the tank and the beverage preparation unit is closed, or the third fluid path such that the connection between the bottom of the tank and the third fluid path via the first fluid path is closed. In certain non-limiting embodiments, the machine further comprises the air pump in the third fluid path for pumping air into the tank either via the first fluid path or the second fluid path, wherein in certain non-limiting embodiments, the air pump is controlled by the control unit. The air pump can also be used to inject air ("bubbling") into liquid during heating to thus mix the liquid for better temperature homogenization. The air pump can also be used to push the liquid out of the tank and via the first fluid path to the beverage preparation unit to extract a beverage.

The fluid circuit can further comprise a fourth fluid path bypassing the first check valve of the second fluid path, wherein the fourth fluid path comprises a second check valve which opens, in certain non-limiting embodiments, at a second calibrated pressure below the calibrated pressure of the first check valve, such as (but not limited to) at a second calibrated pressure below 1 bar. In addition, in certain non-limiting embodiments, the fluid circuit comprises a second control valve, which is controlled by the control unit in certain non-limiting embodiments, for selectively closing the third fluid path or the fourth fluid path.

A liquid pump can be provided in the fluid circuit, such as (but not limited to) in the first fluid path or between the first control valve and the beverage preparation unit, for pumping liquid form the tank to the beverage preparation unit, wherein in certain non-limiting embodiments, the liquid pump is controlled by the control unit.

The fluid circuit can further comprise a third control valve, which is controlled by the control unit in certain non-limiting embodiments, wherein the third control valve is positioned downstream the liquid pump in the first fluid path for selectively opening or closing a drainage fluid path. The drainage fluid path allows for an evacuation of liquid into a drip tray placed below the beverage preparation unit. This can be useful to divert initial too cold liquid—e.g. liquid which remained in the fluid circuit—into drip tray before the heated liquid is delivered to the beverage preparation unit by switching the third control valve.

The second fluid path and/or the drainage fluid path are fluidly connected to a drip tray of the beverage preparation unit. Hence, any leaking liquid can be easily collected and removed by a user.

The mobile beverage dispensing machine can further comprise temperature control sensor means being provided in the tank, wherein the temperature control sensor means are connected to the control unit and the measured temperature data received from the temperature control sensor means can be used as input for controlling the heating means. This allows for a permanent temperature and level control during both dispensing mode and energy autonomous holding mode, such as (but not limited to) via NTC sensors as temperature control sensor means.

The tank can be releasably provided in the machine, wherein in certain non-limiting embodiments, the tank comprises quick-release fluid connector for fluidly connecting the tank with the fluid circuit and/or electrical connector for electrically connecting the heating means with the main power supply connector and the mobile power source via, in certain non-limiting embodiments, the control unit as well as the temperature control sensor means, if provided, with the control unit. Hence, the tank can be used as mobile liquid tank. In certain non-limiting embodiments, liquid can be heated outside the machine and/or tanks can be easily replaced, when required.

The tank can comprise a lid for selectively covering the tank body, wherein the heating means and/or the temperature control sensor means and/or part of the fluid circuit can be provided within the lid. As many technical components are integrated in the lid (heater(s), electrical and fluid connector, temperature sensor(s), . . . ), the tank can be kept simple and standard thus allowing for an easy maintenance and cleaning of the tank and guaranteeing a performing insulation.

In a second non-limiting aspect, the present disclosure relates to a method for preparing a beverage using the mobile beverage machine as aforementioned, comprising the steps of:
controlling and operating at least part of the heating means by external power to heat up the liquid in the tank as the machine is supplied in electrical power by the main power supply connector connected to an external power source,
controlling and operating at least part of the heating means by power of the mobile power source to keep heating liquid in the tank as the machine is stopped being supplied in electrical power from the at least one main power supply connector.

The heating step can further comprise the steps of:
controlling and operating at least part of the heating means by external power to heat up the liquid in the tank as the machine is supplied in electrical power by the main power supply connector connected to an external power source,
controlling and operating at least part of the heating means by power of the mobile power source to keep heating liquid in the tank as the machine is stopped being supplied in electrical power from the at least one main power supply connector.

wherein the heating step further comprises the steps of:
actuating the air pump to fill air inside the tank.

The delivering step may further comprise the steps of:
closing the first fluid path to the beverage preparation unit and opening the third fluid path to the first fluid path via the first control valve,
optionally closing the fourth fluid path and opening the third fluid path to the second fluid path via the second control valve,
delivering air into the tank by using the air pump to create an overpressure in the tank,
closing the third fluid path to the first fluid path and opening the first fluid path via the first control valve,
delivering liquid from the tank through the first fluid path,
optionally operating the liquid pump for delivering the liquid through the first fluid path,
optionally opening the third control valve for a predetermined time to connect the first fluid path and the drainage fluid path to allow unheated liquid to escape into the drip tray,
delivering heated liquid from the first fluid path to the beverage preparation unit, and
preparing a beverage using the heated liquid and dispensing the prepared beverage,
stopping the air pump and liquid pump and closing the first fluid path to the beverage preparation unit and opening the third fluid path via the first control valve.

Other different operations may be envisaged for the machine of the present disclosure.

Figure 1B:
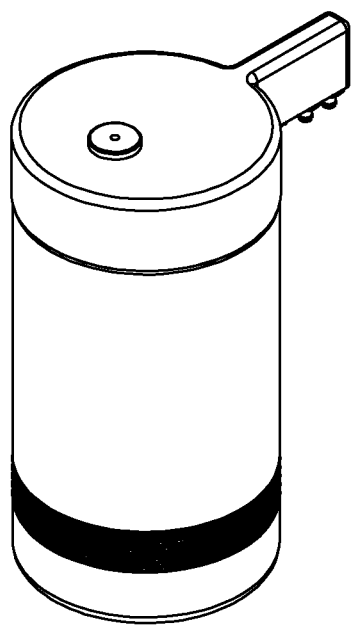
Figure 1C:
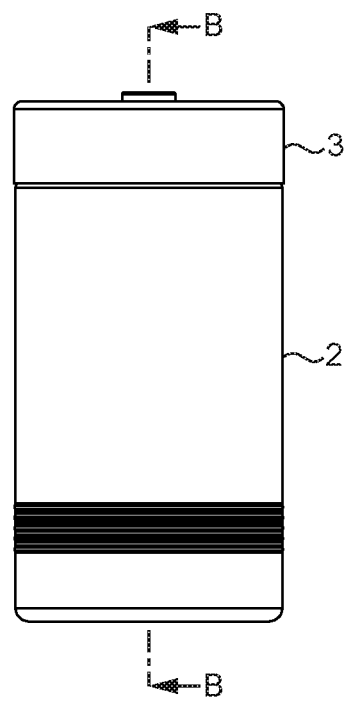

FIG. 1 shows a mobile liquid tank T according to the present disclosure. The tank T comprises an insulated tank body 2 for receiving and storing a liquid 1. The tank body can be made of any suitable material and, in certain non-limiting embodiments, has a two-walled layout having an insulating material—like air—between these two wall portions. The tank body is thus similar to known thermos flasks. The better the insulation quality of the tank or flask, the longer the temperature can be held with a given battery capacity and tank volume. However, the present disclosure is not limited to such a kind of tank bodies.

The tank T further comprises a heating means H for heating the liquid 1 in the tank body 2. Therefore, the heating means H comprises at least one but, in certain non-limiting embodiments, at least two heating elements 17, 18. According to FIG. 1 the heating means H comprises a first heating element 17 for heating up the liquid 1 in the tank T or tank body 2 to a predetermined temperature, such as (but not limited to) the temperature of service. In certain non-limiting embodiments, the temperature corresponds to the temperature of preparation of the beverage. It can typically range from 30 to 95° C. depending on the type of beverage. For example, for coffee extracted from roast and ground coffee, in certain non-limiting embodiments, the temperature is comprised between 90 and 95° C. The heating means H further comprises a second heating element 18 for keeping the temperature of the heated liquid 1 in the tank T at a substantially constant value. Therefore, the second heating element 18 is used for compensating nearly 100% of the heat loss in the liquid tank from the predetermined temperature. The first and second elements are typically elements converting electricity into heat through the process of resistive or Joule heating. Electrical current passing through the element encounters resistance, resulting in heat being produced. To allow for a reliable heating of the liquid 1, the heating elements extend into the tank body 2 such as (but not limited to) from an upper part—e.g. an upper opening of the tank T—downwards such as (but not limited to) towards a bottom of the tank T inside the tank body 2. In certain non-limiting embodiments, the heating elements end in the vicinity of the bottom of the tank T.

The tank T can further comprise sensor means 19, 20, like temperature control sensor means, provided in the tank T. Like the heating means H, also the sensor means 19, 20 extend, in certain non-limiting embodiments, into the tank T or tank body 2. According to a particular (but non-limiting) embodiment, the sensor means 19, 20 are formed of at least two NTC sensors having different lengths to thus extend at different depths inside the tank body 2. In particular, a long NTC sensor 19 and a short NTC sensor 20 or equivalent sensors are respectively provided which are both suitable for measuring the temperature of the liquid at two different levels in the tank. A more accurate temperature regulation and/or heating operation can be processed accordingly. For example, above a certain temperature variation, a homogenizing operation of the liquid can be done such by supplying air inside the tank as further described later. Such NTC sensors can also act as liquid level detectors, wherein the longer sensor 19 can be used as low level sensor and the shorter sensor 20 can be used as a full liquid level sensor for indicating the filling level of the tank T, e.g., during filling liquid in the tank or pumping liquid out.

The tank T can further comprise a lid 3 for covering or closing the tank body 2. A sealing means 5 such as a rubber gasket can be provided between the lid 3 and the tank body 2 so that the tank T is sealably closed once the lid 3 is provided on the tank body 2. The sealing means 5 can be designed such that the lid 3 can be attached to the tank body 2 by a press-fitting connection. In certain non-limiting embodiments, the lid is of thick plastic (either fully solid or filled with foam) for efficient insulation.

In certain non-limiting embodiments, the lid 3 comprises a filling opening 50 which is closeable, in certain non-limiting embodiments, by a plug 4 which can comprise a vent hole or valve 51 enabling fluid equilibrium inside the tank during liquid dispensing. The plug 4 can be made of rubber and the like. Since real level indicators can hardly be used in a mobile liquid tank T without prejudice to insulation, and since any opening including the filling opening 50 and vent 51 should be as small as possible in order to reduce the temperature loss, the use of the NTC sensors is an advantage for accurately measuring the filling level in the tank.

In certain non-limiting embodiments, the heating elements 17, 18 and/or the temperature control sensor means 19, 20 are all connected to the lid 3 such that they extend from the lid 3 in a way to be positioned inside the tank body 2. The relative positions of these means inside the tank are thus automatically and constantly set by connection of the lid to the tank body.

Figure 2A:
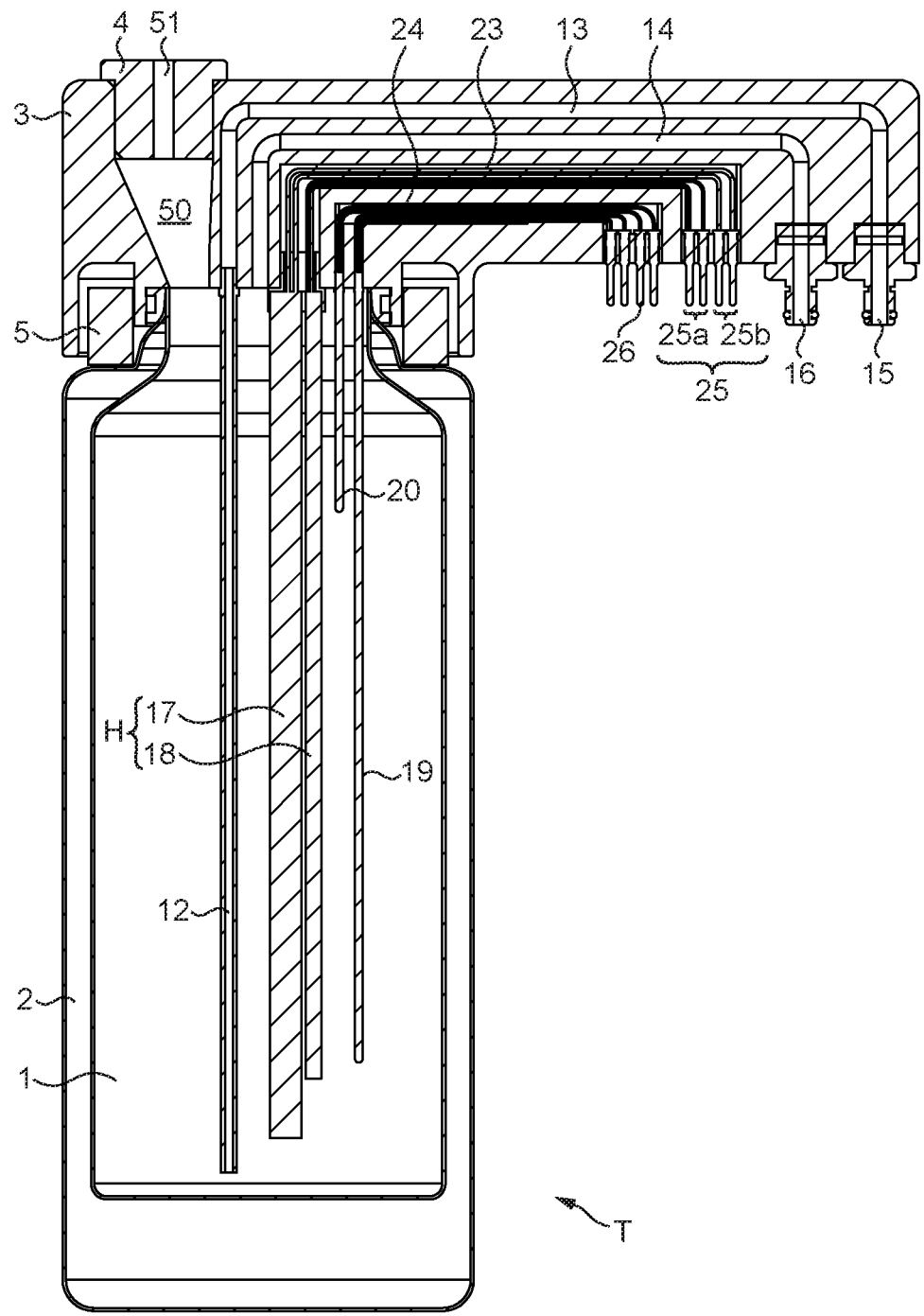
FIG. 2 (a-c) shows a mobile liquid tank according to a second embodiment of the present disclosure.
Figure 2B:
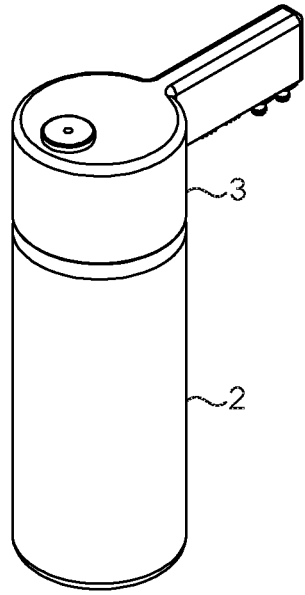
Figure 2C:
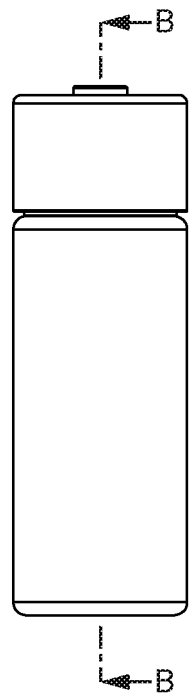
Figure 3A:
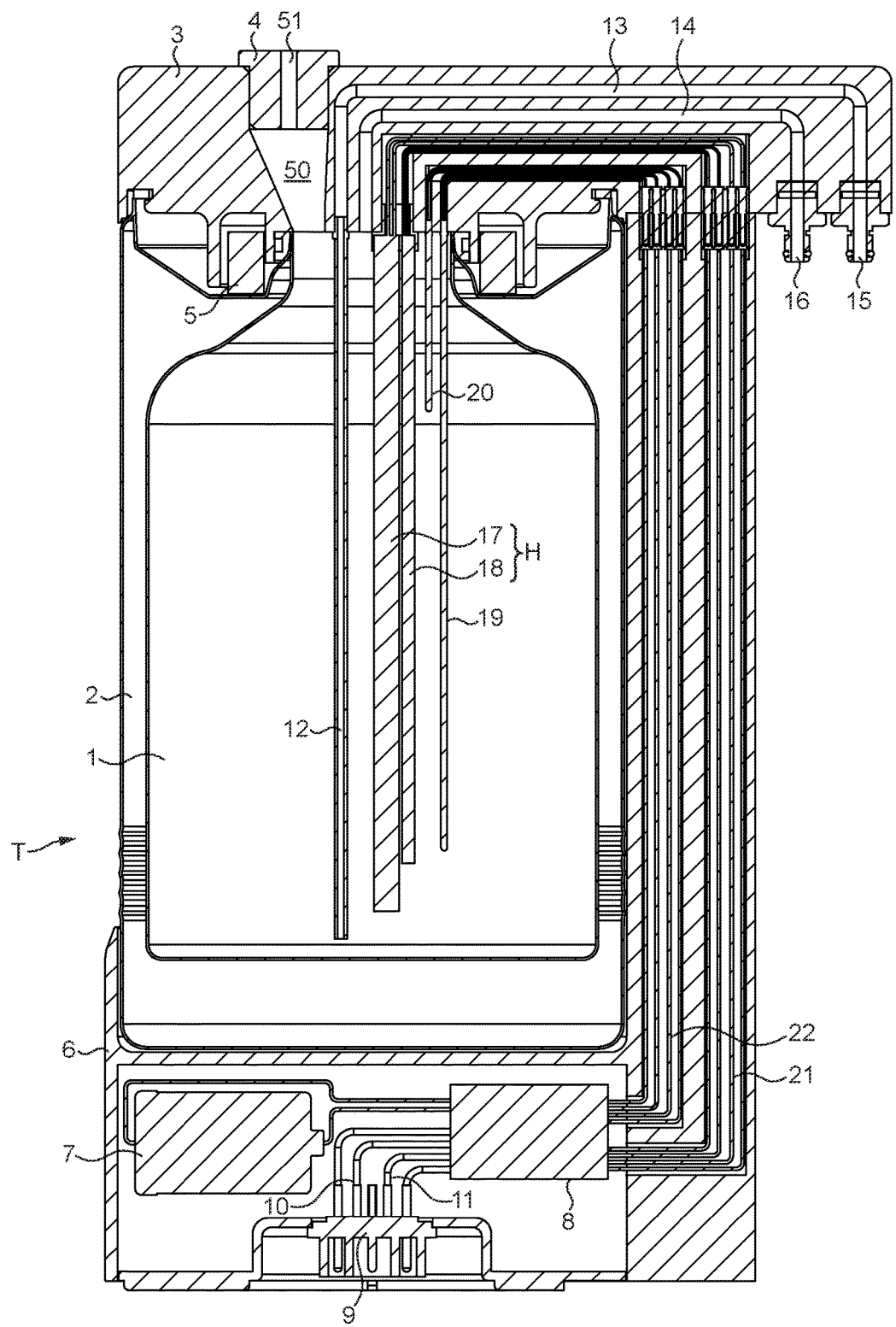
FIG. 3 (a-c) shows a mobile liquid tank according to FIG. 1 as well as a separate housing having a mobile power source, a main power connector and a control unit.
Figure 3B:
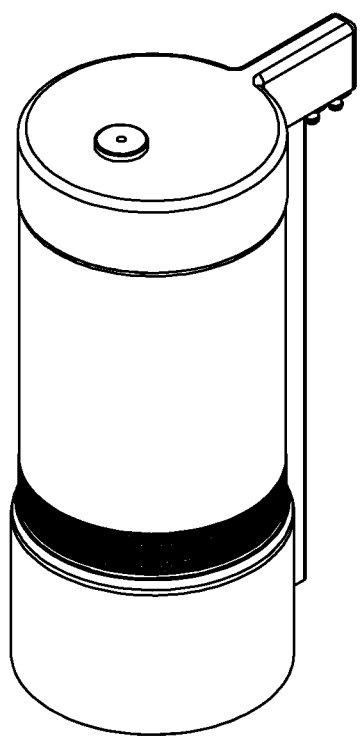
Figure 3C:
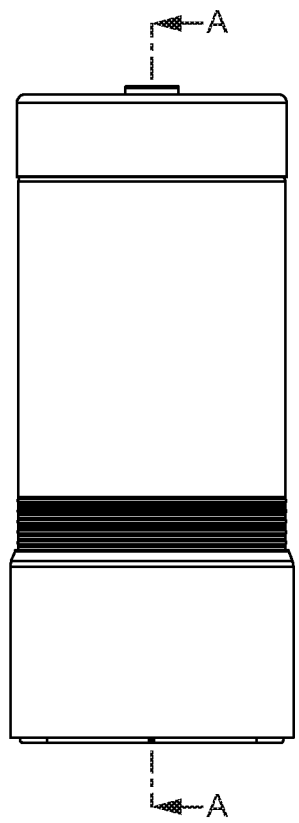

According to a particular (but non-limiting) embodiment of the present disclosure, the tank T can further comprise a first fluid path 13 fluidly connecting the bottom of the inside of the tank T to a fluid connector 15 and a second fluid path 14 fluidly connecting a top of the inside of the tank T to a second fluid connector 16. Both connectors 15, 16 are open to ambient air when the tank is in a standalone configuration as illustrated in FIG. 1, 2 or 3. To allow the first fluid path 13 to reach down to the bottom of the tank T, the fluid path extends in the form of a tube 12 into the tank T towards the bottom of tank body 2. In a particular (but non-limiting) embodiment, the first and second fluid paths 13, 14 are desirably provided in and thus extend through the lid 3. A part of the first fluid path 13 extending down to the bottom of the tank T can be provided as a separate tube 12 which can be releasably plugged into the lid 3 to form the first fluid path 13.

In certain non-limiting embodiments, first and second fluid connectors 15, 16 are self-closing when they are not complementarily plugged with external connectors to better insulate the content of the tank T. For this, each connector may comprise an integrated shut-off valve. Each connector is, in certain non-limiting embodiments, of a quick-release type for which connection is obtained without tool and by simple press-fitting engagement. The connector typically comprises a male or female press-fit portion and a seal member such as a rubber gasket attached thereto. The connectors are positioned in parallel and at a same directional level so enabling a press-fitting engagement all at once with a tank receiving device.

According to the present disclosure, the first heating element 17 is configured to be connectable to an external power source. The external power source is a high voltage power source such as 110 or 230 VAC. The second heating element 18 is configured to be connectable to a mobile power source 51 of a mobile tank receiving device (M) as, for instance, depicted in FIG. 6. The mobile power source is a low voltage power source such as a battery delivering 12 or 24 VDC. The mobile power source is preferentially (but not by way of limitation) electrically rechargeable. Examples of rechargeable batteries can be: flow battery, fuel cell, lead-acid battery, lithium, molten salt, nickel, sodium, potassium, silver, silicone-air and combinations thereof.

According to the embodiment of FIG. 1, such a connection can be obtained by two parallel sets of electrical cables 23 of the respective heating element 17, 18 extending, in certain non-limiting embodiments, through the lid 3 to the connector 25 formed by two electrical connectors 25a, 25b (each one linked to one heating element) being accessible from an outside of the tank T. In certain non-limiting embodiments, the connectors are also identical and placed at the same directional level each other (and, in certain non-limiting embodiments, to the fluid connectors 15, 16 too) to facilitate plugging with complementary electrical connectors of a tank receiving device or control housing.

Alike, the temperature control sensor means 19, 20 can also comprise two sets of electrical cables 24 extending, in certain non-limiting embodiments, through the lid 3 to a corresponding electrical connector 26 formed by two connectors 26a, 26b; each one linked to one sensor.

Hence, in order to keep the tank T technology simple, in certain non-limiting embodiments, all these fluid and electrical flow means are integrated in or connected to the lid 3 thus allowing for an easy maintenance and cleaning.

FIG. 2 shows a second embodiment of the mobile liquid tank T according to the present disclosure which is similar to the tank T according to the first embodiment of FIG. 1 but having a smaller tank body 2 (i.e. of smaller liquid storage capacity and footprint) and a correspondingly adapted lid 3.

FIG. 3 illustrates a third embodiment of a mobile liquid tank T according to the present disclosure. To avoid unnecessary repetition, the technical characteristics described and illustrated in relation to the previous embodiments can be used as well for the present embodiment. According to this embodiment, the tank T further comprises a housing 6 for receiving control means in particular a control unit 8. The control unit 8 is configured to control and operate the first heating element 17 by external power to heat up the liquid 1 in the tank T in case the first heating element 17 is connected to an external high voltage power source. The control unit 8 is further configured to control and operate the second heating element 18 by power of a mobile low voltage power source 7 to substantially keep constant the temperature of the heated liquid in the tank T when the first heating element 17 is no longer connected to the external power source. As mentioned already, the mobile power source is a low voltage power source such as a battery delivering 12 or 24 VDC. In certain non-limiting embodiments, the mobile power source is preferentially (but not by way of limitation) electrically rechargeable. Examples of rechargeable batteries can be: flow battery, fuel cell, lead-acid battery, lithium, molten salt, nickel, sodium, potassium, silver, silicone-air and combinations thereof. The temperature of the heated liquid can be kept constant by means of the first heating element 17 as long as the external power is supplied and then by the second heating element 18 powered by the mobile power source 7 when the external power is no longer supplied. The mobile power source or battery can be housed inside the housing 6 thereby making the liquid tank T easily transportable while guaranteeing the heating continuity and maintenance of the suitable liquid temperature at all time.

As a possible operation the control unit 8 may also operate the heating element 18 to at least partially heat up the liquid in case the tank T is (accidentally or voluntarily) unplugged from the external power source before the liquid had reached the predetermined and desired temperature. This operation can be optional and its implementation may be subjected to temperature conditions such as a minimal temperature threshold reached by the liquid heated by the first heating element.

Figure 4A:
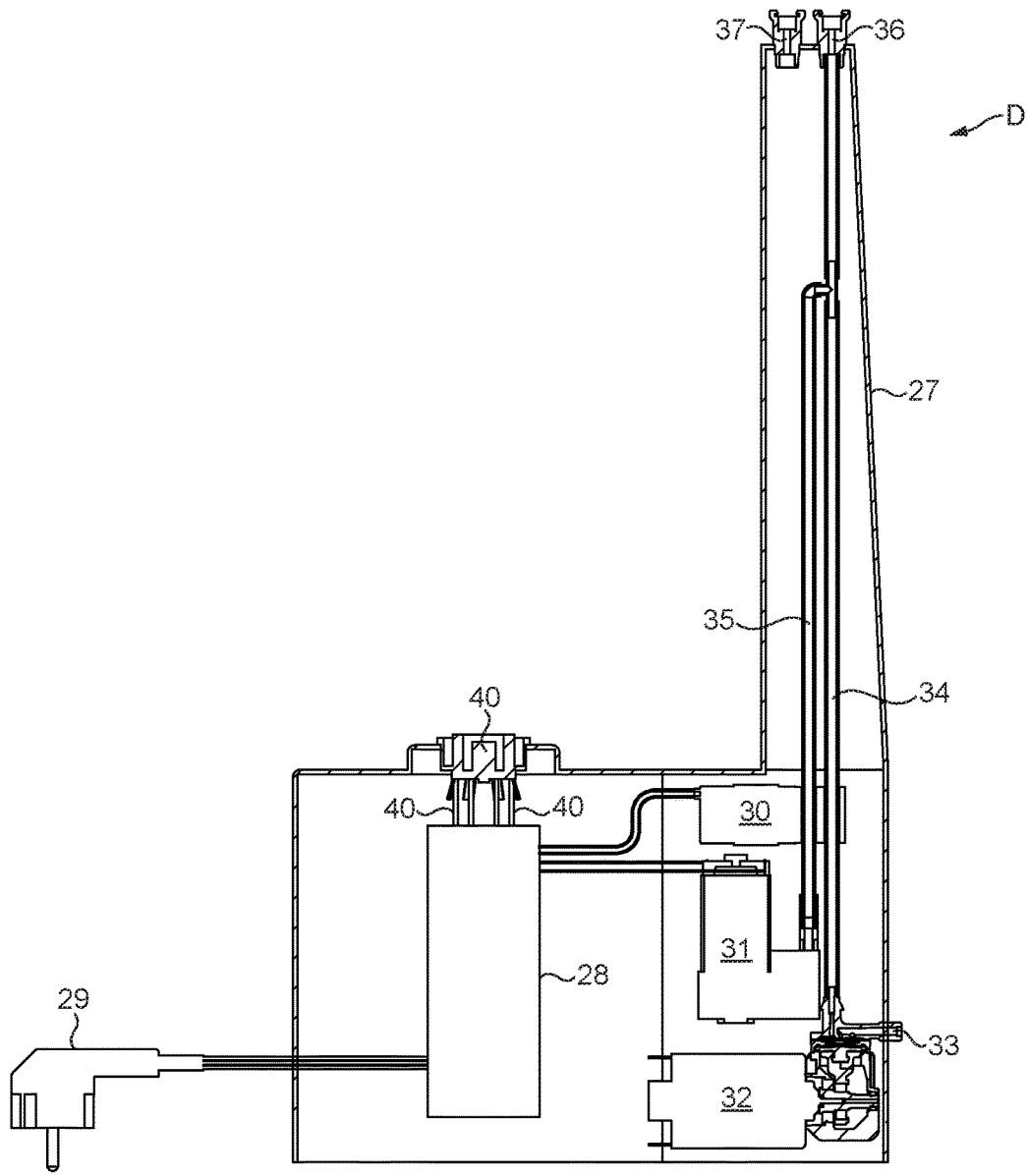
FIG. 4 (a-c) shows a docking station according to the present disclosure.
Figure 4B:
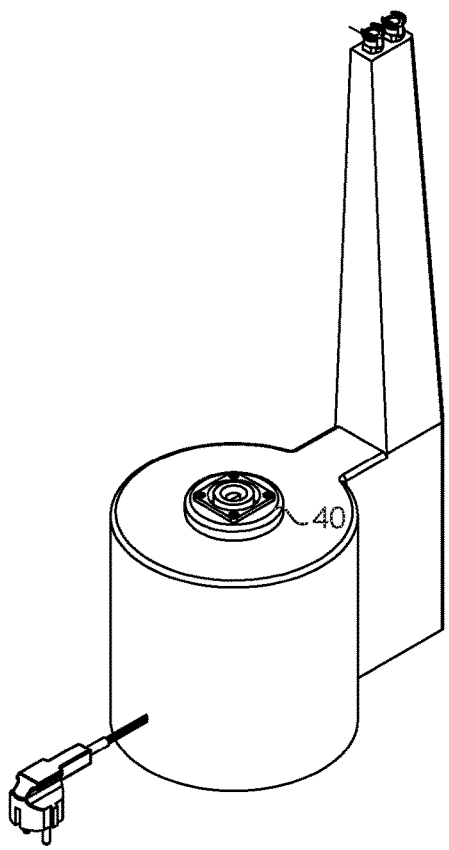
Figure 4C:
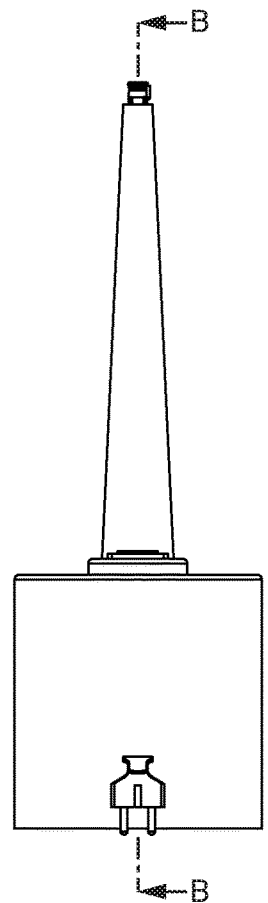

The tank T can further comprise an external power supply connector 9 which is connected by cables 10, 11 to the first heating element 17 such as (but not limited to) via the control unit 8. The mains or external power supply connector means 9 is thereby connectable to an external power source; either directly or via a tank receiving device D, M for receiving the tank T as will be described herein below. In certain non-limiting embodiments, the power supply connector 9 is a cordless connector arranged to engage with a base connector of an external base unit. The base connector 40 can be integrated to the tank receiving device as illustrated in FIG. 4. This connecting assembly (e.g. Strix control) is widely used such as for water kettles and does not need to be further described. In such configuration, the control unit 8 can be further configured to recharge the mobile power source 7 using the external power through the external power supply connector 9.

To allow for an automatic temperature control, the temperature control sensor means 19, 20 can be connected to the control unit 8 and the measured temperature data received from the sensor means can be used as input for controlling the heating means H.

Figure 10A:
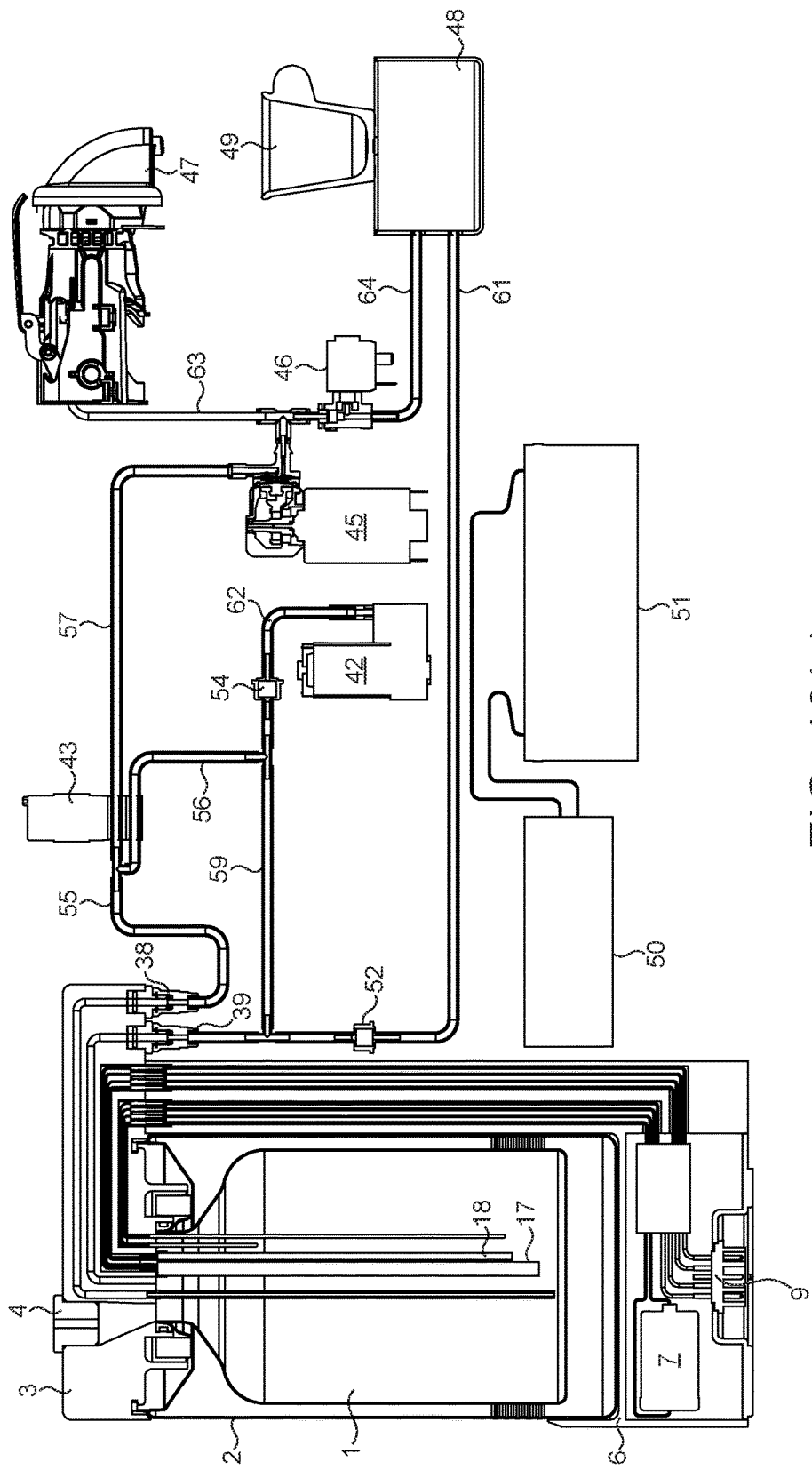
FIG. 10 (a-b) comprises a liquid heating system according to a sixth embodiment of the present disclosure having a mobile liquid tank according to FIG. 3.
Figure 10B:
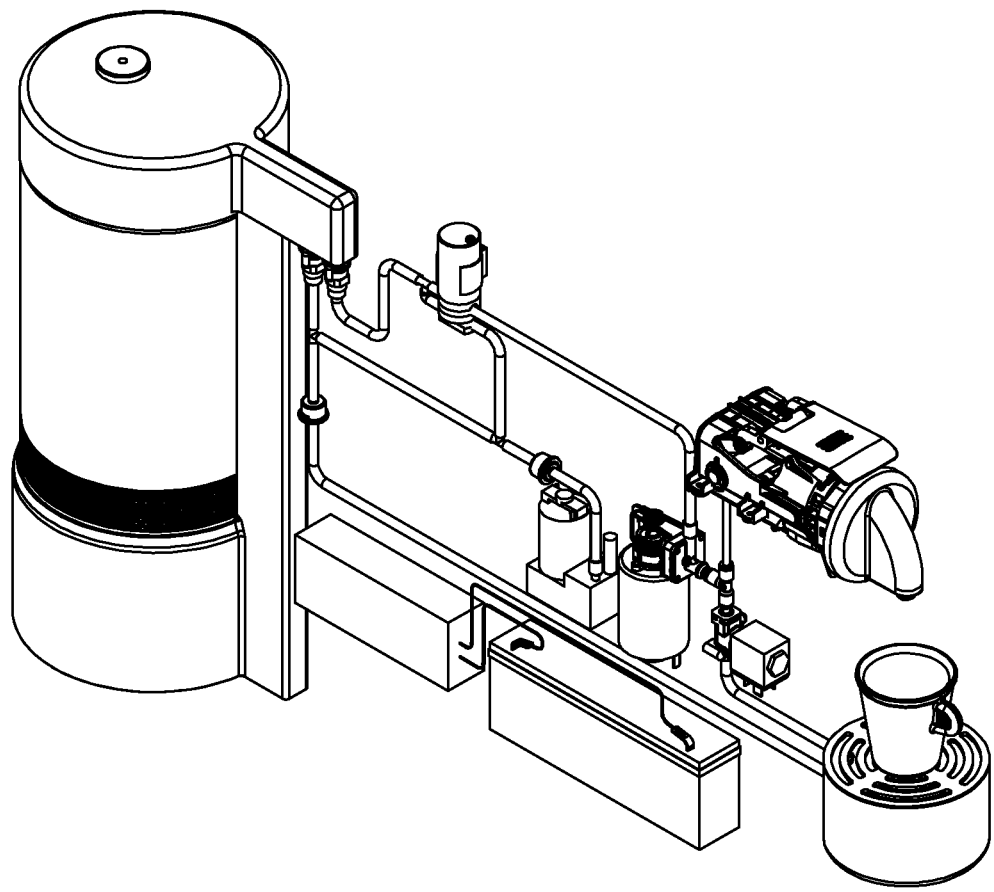
Figure 11A:
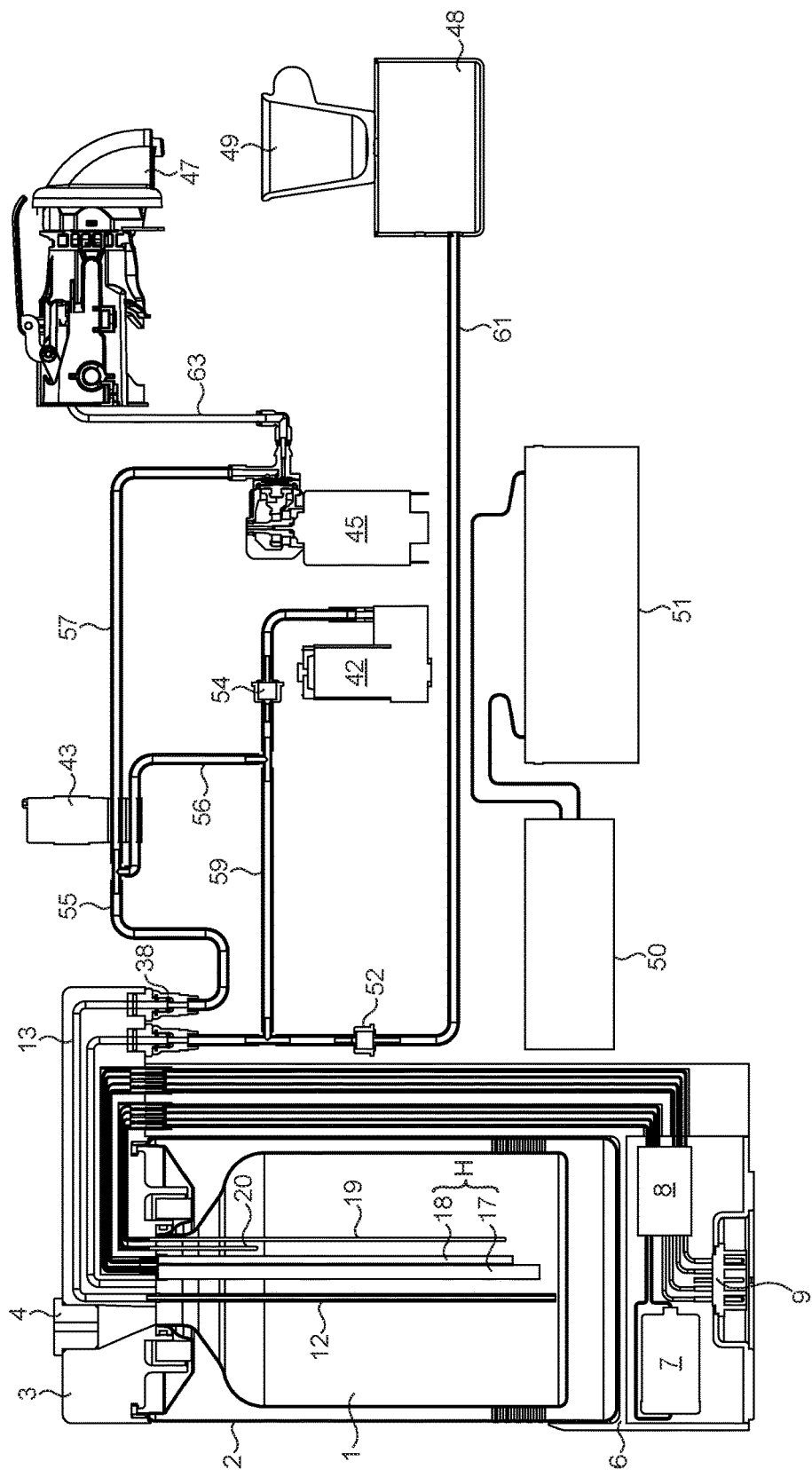
FIG. 11 (a-b) shows a liquid heating system according to a seventh embodiment of the present disclosure.
Figure 11B:
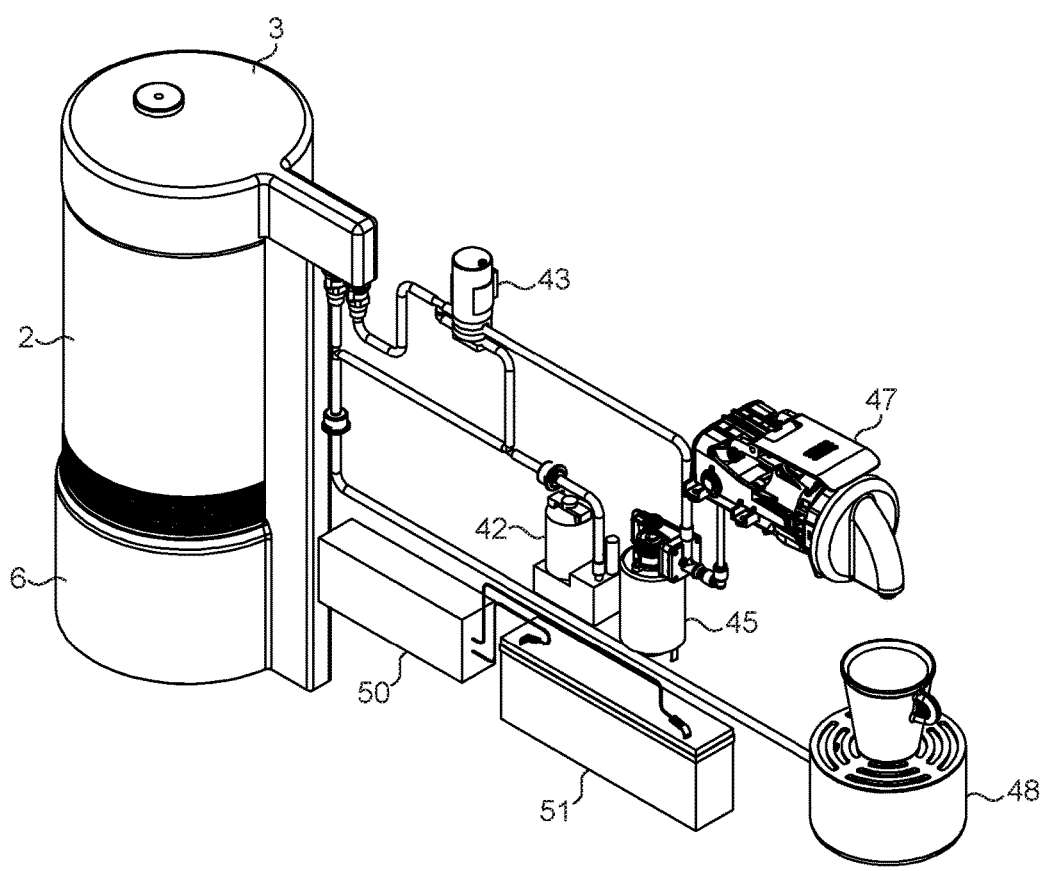

According to the embodiment of FIG. 3, the mobile power source 7, the external power supply connectors 9 and the control unit 8 are provided in a separate housing 6 which can be releasably attachable to the tank body 2. The attachment of the housing can be obtained by way of by way of male or female electrical connectors complementary to female or male electrical connectors 25, 26. Additional mechanical attaching means can be provided if necessary such as a threading or an anchoring mechanism. The separate housing 6 can form a support for the tank body as shown in FIG. 3 but it can also be a housing of a mobile beverage dispensing machine as shown in FIGS. 10 and 11, or the like. In certain non-limiting embodiments, the separate housing 6 can be designed such that the tank body 2 can be placed thereon in only one predefined position in particular as defined by the position of the electrical connectors 25, 26.

When the housing 6 is connected with the liquid body 2 by more permanent connection means such as screws, rivets and/or welding or is integrally formed with it, the separate electrical connectors 25, 26 can be avoided and the heating means H and temperature sensor means 19, 20 can be directly connected to the control unit 8 via electrical cables 21, 22.

In the following, different embodiments of liquid heating systems are described. It should be noted that many other variants are possible which can combine different characteristics of these embodiments.

In general, a liquid heating system S according to the present disclosure comprises a mobile liquid tank T according to the present disclosure and a tank receiving device D, M having a main or high voltage power electrical connector 29 for electrically connecting the first heating element 17 or the external power supply connector 9 with an external high voltage power source. The power supply connector or the external power electrical connector according to the present disclosure can be any kind of electrical connector, such as (but not limited to) a main power plug which can be used to plug the system to an external power source for heating up the liquid and/or charging the mobile battery source 7, 51.

Figure 5A:
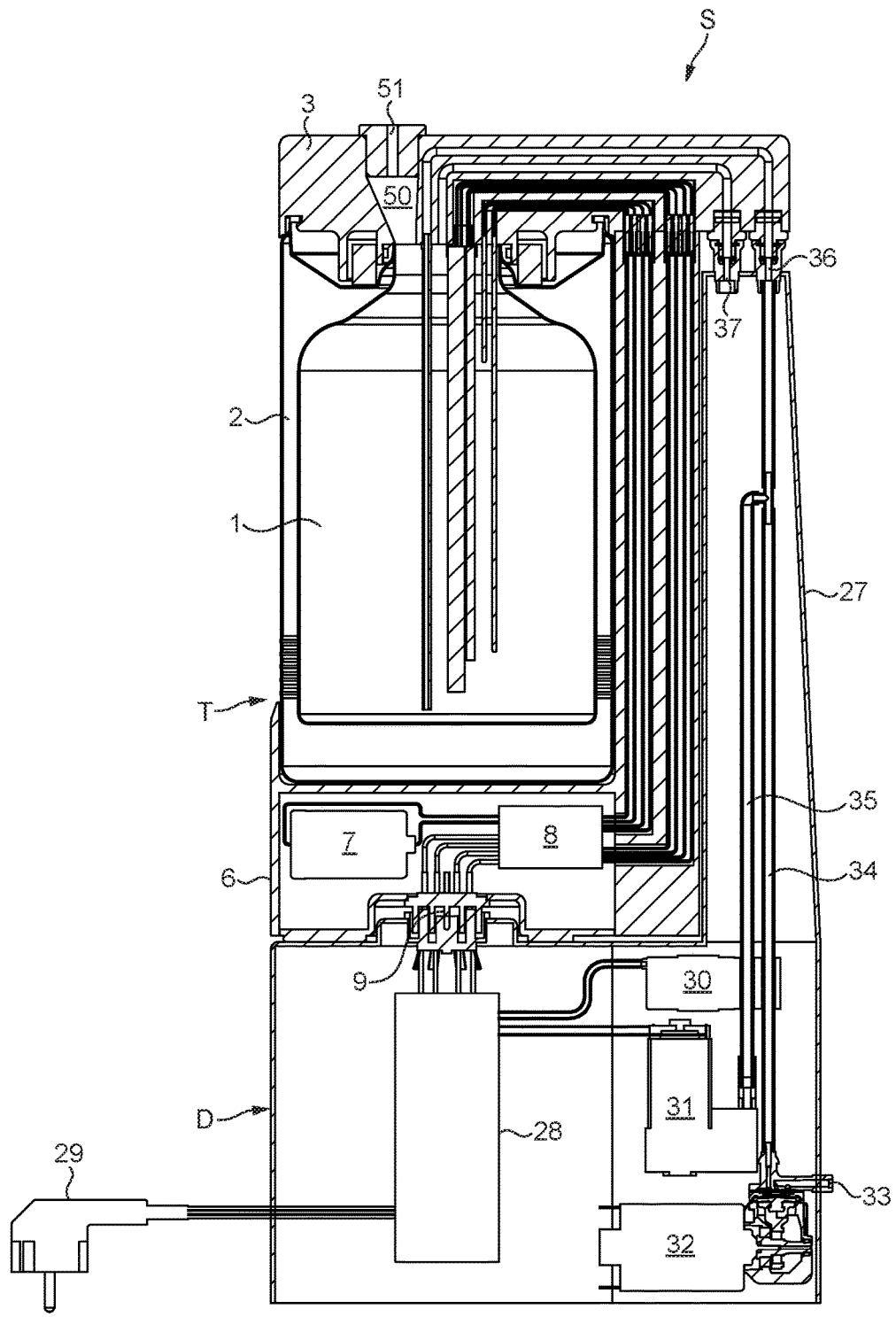
FIG. 5 (a-c) shows a liquid heating system according to a first embodiment of the present disclosure having a mobile liquid tank according to FIG. 3 and a docking station according to FIG. 4.
Figure 5B:
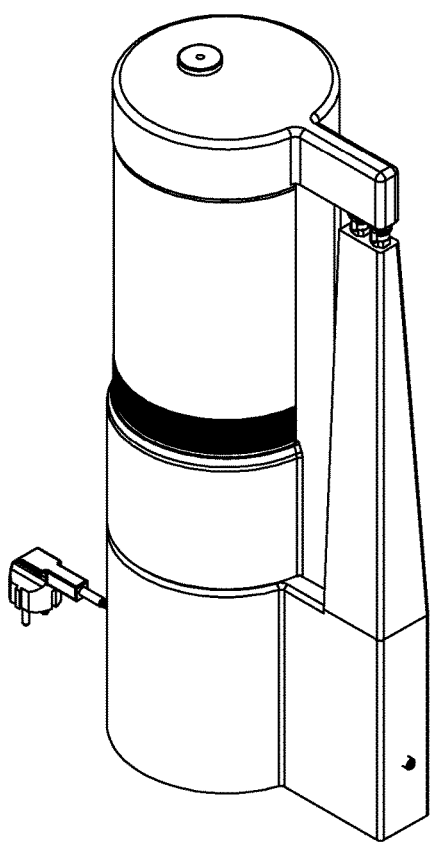
Figure 5C:
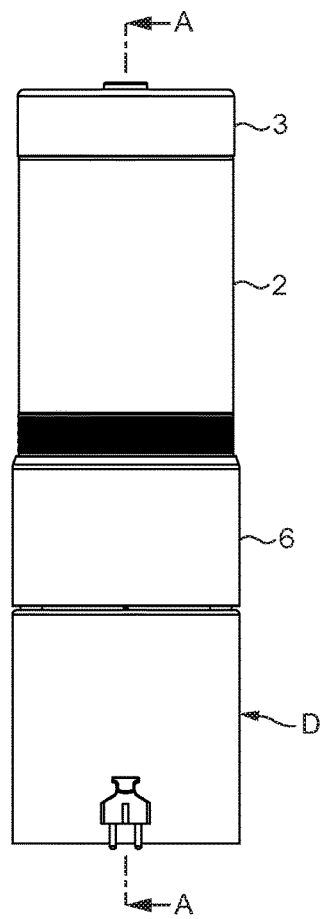

In view of FIGS. 4 and 5, a tank receiving device can be a docking station D. The tank T can be electrically connected with the docking station D and thus indirectly to the external power (via the main power electrical connector 29) by means of an electrical connector 40 which is, in certain non-limiting embodiments, designed such that electrical connection between the docking station D and the tank T (or separate housing 6) is automatically obtained by simply placing the tank T on the docking station D. Such electrical connector can be a cordless connector base as described earlier.

According to a particular (but non-limiting) embodiment, the docking station D comprises a control valve 30 for selectively connecting the first fluid path 13 either within an air pump 31 via an air fluid path 35 for pumping air into the tank body 2 via the first fluid path 13, or a liquid pump 32 for pumping a liquid to be heated via a liquid fluid path 34 into the tank body 2 via the first fluid path 13. In certain non-limiting embodiments, the liquid fluid path 34 comprises a liquid connector 33 which is connectable to an external liquid source like a tap or another kind of liquid supply. In a general manner applicable to the control valve 30 and any other similar ones of the present disclosure, such valve is designed to engage in opening with two fluid paths alternatively. Such control valve encompasses any other designs in which the valve is constituted of two separate or independent valves and controlled alternatively by the control unit.

According to a particular (but non-limiting) embodiment, the docking station D desirably comprises a second control unit 28 for operating and controlling the control valve 30, the air pump 31 and the liquid pump 32. It is noted that the control unit 28 can also be used—in addition or alternatively to the first control valve 8—to charge the battery 7 and to operate and control the heating means H as well as the temperature control sensor means 19, 20.

The docking station D can further comprise a (third) fluid connector 36 for, in certain non-limiting embodiments, releasably connecting an air/liquid (i.e. fluid) delivery fluid path to the first fluid connector 15 of the first fluid path 13. The air/liquid delivery fluid path is the system comprising the control valve 30, the air and liquid pumps 31, 32 as well as the air and liquid fluid paths 34, 35. The docking station D may further comprise a (fourth) fluid connector 37 open to ambient air and releasably connectable to the second fluid connector 16 of the second fluid path 14. Such last connector enables the safe release of an overpressure in the tank.

All the components of the docking station D can be housed in a housing 27 of the docking station D.

In the following, a method for heating a liquid using a mobile liquid tank T according to the present disclosure or a liquid heating system S according to the present disclosure will be described. Such a method mainly comprises the steps of providing a liquid 1 to be heated in the tank T, heating the liquid 1 in the tank T to a predetermined temperature by means of the first heating element 17 powered by external power, and keeping the temperature of the heated liquid 1 by means of the heating means H such as (but not limited to) the first heating element 17 when external power is supplied or the second heating element 18 powered by the mobile power source 7 when external power is not supplied (e.g. when the main power electrical connector 29 is unplugged).

In certain non-limiting embodiments, the steps of providing and heating the liquid 1 may comprise the following steps:

In the docking station, the liquid fluid path 34 can be opened and the air fluid path 35 can be closed by means of the control valve 30 operated by its control unit 28. Liquid 1 can be filled in the tank body 2 by means of the liquid pump 32 from an external source of fresh liquid such as a tap or a water dispenser. In certain non-limiting embodiments, fresh liquid 1 is filled into the tank T until the upper NTC sensor 20 detects a full level status of the tank T. Then the liquid pump 32 is stopped. The first heating element 17 can be switched on to start heating up the liquid 1 in the tank T. The liquid fluid path 34 can be closed and the air fluid path 35 can be opened by means of the control valve 30. Optionally air can be delivered from the air pump 31 via the first fluid path 13, 12 to the bottom of the tank T. Such introduction of air in the tank is, in certain non-limiting embodiments, carried out during the heating of the liquid 1 in the tank T in order to avoid or reduce a temperature gradient in the tank during the heating step. Overpressure can be evacuated through the second fluid path 14 and the open fluid connector 37. At the end of the heating process to the predetermined temperature—such as (but not limited to) measured by the temperature sensor means 19, 20—has been reached, the first heating element 17 can be switched off. The air pump 31 can also be switched off. The tank T is now ready for an operation on a mobile machine M as will be described in the following. As long as the tank T remains on the docking station D and the station is connected to the mains, the temperature of the liquid 1 is remains regulated with the first heating element 17 but once the heating element 17 stops being supplied by the external power source, for example, by removing the tank from the docking station D, the mobile power source takes over and supplies the second heating element 18 that becomes automatically active and regulated by the control unit 8 of the tank.

The heating method can be carried out automatically and can be for example initiated by pushing a start button (not shown). The mobile power source can be charged whenever the tank T is docketed and connected to an external power source. The detection of high voltage power received by the control unit 8 can automatically trigger the switchover from the "autonomous energy supply" mode to the "assisted energy supply" mode.

According to the present disclosure, the liquid heating system S can also comprise, instead of a docking station D, as described before, a mobile beverage dispensing machine M (e.g. see FIGS. 6 to 11) as the tank receiving device. In this case, the first and second fluid paths 13, 14 are, in certain non-limiting embodiments, connected to and thus form part of a fluid circuit of the machine M for delivering the heated liquid 1 from the tank T to a beverage preparation unit 47 for preparing a beverage using the heated liquid 1 and dispensing a prepared beverage. In case of a mobile beverage dispensing machine M, the mobile power source and/or the control unit can be a mobile power source 51 and/or control unit 50 of the respective machine M as will be described herein below with respect to FIGS. 6 to 11.

According to the present disclosure, also the mobile beverage dispensing machine M as such comprising—as a part of the mobile beverage dispensing machine M—the liquid tank T as will be described herein below forms part of the present disclosure.

Such a mobile beverage dispensing machine M according to the present disclosure comprises a liquid tank T as described herein above and also depicted in FIGS. 1, 2 and 3. In FIG. 6 a liquid tank T as depicted in FIG. 1 is shown. The liquid tank T thus has a thermally insulated tank body 2 for receiving and storing the liquid 1 used for preparing a beverage. The machine M further comprises the beverage preparation unit 47 for preparing a beverage using the liquid 1 and dispensing the prepared beverage. Such beverage preparation unit 47 are well-known in the prior art so that a detailed explanation is not necessary. It is noted, however, that such beverage preparation unit 47 can, for instance, be a brewing unit adapted to receive a capsule containing a beverage ingredient to be extracted like roast and ground coffee or tea.

The machine M further comprises a liquid fluid circuit for delivering the liquid 1 from the tank T to the beverage preparation unit 47. Such a fluid circuit can be designed in many different ways. For instance, the fluid circuit generally comprises at least one or a plurality of fluid paths—like tubes or conduits—to deliver a fluid like the (heated) liquid or air.

The machine M further comprises heating means H for heating the liquid 1 in the tank T. Such heating means H are already described before. It is, however, noted that according to the present disclosure the heating means H do not necessarily comprise two physically separated heating elements 17, 18 but the heating elements 17, 18 can also be formed as a single member. For example, the second heating element 18 can be a resistive wire which is coiled around the first heating element 17 forming a main rod-type resistance.

The machine M further comprises a main or external power supply connector 80 connectable to an external power source for operating the heating means H, and a mobile power source 51 for operating the heating means H. According to a principle of the present disclosure, the heating means H comprises the first heating element 17 and the second heating element 18, wherein the first heating element 17 is configured to be connectable to an external power source and the second heating element 18 is connected or connectable to the mobile power source 51.

The machine M further comprises a control unit 50 which—like the control unit 7—is configured to control and operate the heating means H in particular the first heating element 17 by external power to heat up the liquid 1 in the tank T when the main power supply connector or heating element H is connected to the external power source. The control unit 50 is further configured to control and operate the heating means H, in particular the second heating element 18 by power of the mobile power source 51 to substantially keep constant the temperature of the heated liquid in the tank T when the main power supply connector or the first heating element 17 is no longer connected to the external power source.

Accordingly, the mobile power source 51 can be a, for example (but not by way of limitation) rechargeable, battery. In a particular (but non-limiting) embodiment, the battery or mobile power source 51 is a mobile power source for operating the machine M. In this case, there is no need for an additional mobile power source 7 as describe herein above. In this regard, it is also noted that the control unit 50 of the machine M can be used in addition or, in certain non-limiting embodiments, alternatively to the control unit 8 of the liquid tank T as, for instance, described in respect of FIG. 3. The control unit 8 of the tank T can thus be omitted. When the control unit 8 is still present, it can be dedicated for the heating regulation of the liquid in the tank.

The machine M may further comprise temperature control sensor means 19, 20 as already described herein above which are provided in the tank T. In certain non-limiting embodiments, the temperature control sensor means 19, 20 are connected to the control unit 50 either of the machine M or of the tank T so that the measured data received from the sensor means 19, 20 can be used as input for controlling the heating means H via the control unit 50 or control unit 8 if any.

As already described above, the tank T can be releasably provided in/on the machine M. In this case, the tank T can be fluidly connected with the liquid fluid circuit of the machine M by means of the fluid connectors 15, 16 on the tank T side as well as the fluid connectors 38, 39 on the liquid fluid circuit side. Moreover, if the heating means H are to be powered by or via the machine M, the heating means H can be electrically connected with the main power supply connectors of the machine M and the mobile power source 51—such as (but not limited to) via the control unit 50—and, if provided, the temperature control sensor means 19, 20 can be connected with the control unit 50 by means of electrical connectors 25, 26 on the tank T side and electrical connectors 67, 68 on the machine M side. The electrical connectors 25, 26 67, 68 can be designed as matching male/female connectors. The electrical connectors 67, 68 can be connected to the control unit 50—or electrical connectors 68 also directly to the main power supply connector and/or mobile power source 51—via electrical cables 65, 66.

In the following, a few embodiments of the mobile beverage dispensing machine M according to the present disclosure are described and in particular a few embodiments regarding the fluid circuit thereof.

As shown in the embodiment of FIG. 6, the fluid circuit can comprise a first fluid path 13, 55, 57, 63 fluidly connecting a bottom of the tank T with the beverage preparation unit 47; i.e. extending therebetween. The machine M may further comprise a second fluid path 61 fluidly connecting a top of the tank T with ambient air; i.e. extending therebetween. In certain non-limiting embodiments, the second fluid path 61 comprises a check valve 52 allowing overpressure in the tank T to escape to ambient air via the second fluid path 61.

The first fluid path 55 and/or the second fluid path 61 can be connected with a third fluid path 56, 59. In case the third fluid path 56, 59 connects both the first fluid path 55 and the second fluid path 61, the fluid circuit further comprises a first control valve 43 which is, in certain non-limiting embodiments, controlled by the control unit 50 for selectively closing the first fluid path 57 such that the connection between the bottom of the tank T and the beverage preparation unit 47 is closed, or the third fluid path 56 such that the connection between the bottom of the tank T and the third fluid path via the first fluid path 55 is closed.

In certain non-limiting embodiments, the machine M may further comprise an air pump 42 in the third fluid path 56, 59. In certain non-limiting embodiments, the air pump 42 is connected to the third fluid path 56, 59 via a fifth fluid path 62 comprising, in certain non-limiting embodiments, a check valve 54 to avoid high pressure reaching the air pump 42. The air pump 42 is provided and configured such that it can fill air into the tank T either via the first fluid path 55 or via the second fluid path 61. In certain non-limiting embodiments, the air pump 42 is controlled by the control unit 50 of the machine.

The fluid circuit may further comprise a fourth fluid path 60 bypassing the first check valve 52 of the second fluid path 61. In certain non-limiting embodiments, the fourth fluid path 60 comprises a second check valve 53 which, in certain non-limiting embodiments, opens at a pressure of about 0 bar. The fluid circuit can then further comprise a second control valve 44, which in certain non-limiting embodiments is also controlled by the control unit 50, for selectively closing the third fluid path 59 such that the connection between the air pump 42 and the second fluid path 61 is closed, or the fourth fluid path 60 is closed.

According to a particular (but non-limiting) embodiment, a liquid pump 45 is provided in the fluid circuit, such as (but not limited to) in the first fluid path 57, and in certain particular (but non-limiting embodiments), between the first control valve 43 and the beverage preparation unit 47. The liquid pump 45 is provided and configured such that it can pump the liquid 1 from the tank T to the beverage preparation unit 47. Also, in certain non-limiting embodiments, the liquid pump 45 is controlled by the control unit 50. The liquid pump 45 can be a pump chosen for providing a low pressure of liquid for example 1-4 bar, for example, for preparation of tea, herbal tea, hot chocolate or filter coffee or high pressure for example 5 bar and up to 20 bar for coffee such as ristretto, espresso, lungo and the like. The pump can be a membrane pump for which the pressure can be actively changed by the control unit. The pump can also be a solenoid piston pump.

The fluid circuit can further comprise a third control valve 46 which, in certain non-limiting embodiments, is also controlled by the control unit 50. In certain non-limiting embodiments, the third control valve 46 is positioned downstream the liquid pump 45 in the first fluid path 63 for selectively opening a drainage fluid path 64 closing the drainage fluid path 64. In certain non-limiting embodiments, the drainage fluid path 63 is open to ambient air at an end opposite to the first fluid path 57, 63.

According to the embodiment of FIG. 6, the second fluid path 61 and/or the drainage fluid path 64 are fluidly connected to a drip tray 48 of the beverage preparation unit 47. In certain non-limiting embodiments, the drip tray 48 is positioned vertically below the beverage preparation unit 47. The drip tray 48 can also be designed such that a container 49 like a cup can be positioned thereon to be disposed vertically below the beverage preparation unit 47 for receiving the dispensed beverage.

In the following, a method for preparing a beverage using the mobile beverage machine M according to the present disclosure will be described. Said method comprises the steps of providing a liquid 1 for preparing a beverage in the tank T. in certain non-limiting embodiments, this is done directly on the machine M, e.g. via the top filling opening 50 or via the docking station D when the tank is connected beforehand. The method further comprises the steps of connecting the main power supply connector of the machine M to an external power source, heating the liquid 1 in the tank T, such as (but not limited to) to a predetermined temperature, by means of the heating means H, in particular the first heating element 17 powered by the external power, keeping the temperature of the heated liquid 1 substantially constant by means of the heating means H, such as (but not limited to) the first heating element 17 when external power is supplied or the second heating element 18 powered by the mobile power source 51 when external power is no longer supplied, and delivering heated liquid 1 via the fluid circuit to the beverage preparation unit 47 for preparing and dispensing a beverage in/from the beverage preparation unit 47.

The heating step of the method according to the present disclosure may further comprise the following steps: the bottom of the tank T can be connected with the air pump 42 such as (but not limited to) by closing the first fluid path 57 to the beverage preparation unit 47 and opening the third fluid path 56 to the first fluid path 55 via the first control valve 43. In this state, the fourth fluid path 60 is opened and the third fluid path 59 is closed via the second control valve 44. The second fluid path 61 via the second control valve 44 is so opened. The fluid path comprising the check valve 52 remains closed because of an opening pressure set above 1 bar (e.g. at 1.8 bar). Air can be delivered from the air pump 42 to the bottom of the tank T when switching on the air pump 42. The air pump 42 can thus be used to inject air into liquid 1 in the tank during heating to thus mix the liquid for a better temperature homogenization.

Overpressure can escape via the second and fourth fluid paths 61, 60 as well as via check valve 53 opening at a pressure of below 1 bar. Optionally, the fourth fluid path 60 can be closed and the third fluid path 59 can be opened via the second control valve 44 once the predetermined temperature is reached. Hence, check valve 52 can regulate a potential (predefined) overpressure, such as (but not limited to) of above 1 bar (e.g. 1.8 bar). The temperature can be kept constant via the heating means H, wherein the power of operating the heating means H is provided by the mobile power source 50 at least once the main power supply connector is disconnected from the external power source.

The delivery step of the method for preparing a beverage according to the present disclosure may further comprise the following steps: the first fluid path 57 can be closed to the beverage preparation unit 47 and the third fluid path 56 can be opened to the first fluid path 55 via the first control valve 43. Optionally, the fourth fluid path 60 can be closed and the third fluid path 59 can be opened to the second fluid path 61 via the second control valve 44. Air can be delivered into the tank T by using the air pump 42 to create an overpressure in the tank T. The third fluid path 56 can be closed to the first fluid path 55 and the first fluid path 57 can be opened via the first control valve 43. Liquid 1 can be delivered from the tank T through the first fluid path 13, 55, 57 up to the delivery pump 45 to prime it. Priming of the pump may be necessary to overcome cavitation effect due to hot liquid supplied to the pump. When the delivery pump 45 is primed, liquid can be delivered at high pressure through fluid path 63 and to the beverage preparation unit 47. However, as air is, in certain non-limiting embodiments, delivered to a top portion of the tank T by the air pump 42 via the second fluid path 14, a small overpressure can be applied to the inside of the tank body 2 so that the liquid 1 will be pushed out of the tank T via the first fluid path 12, 13 even without the support of the liquid pump 45. The present disclosure thus also proposes a method to empty the tank T without opening the lid 3, while just using an air pump 42 to push the liquid 1 out of the tank T, such as (but not limited to) through the lid 3. This also allows for pumping the liquid 1 without pump contact to the liquid 1 and thus helps reducing a contamination and scale problems of the liquid 1, tank T and fluid circuit. Apart from the avoidance of a temperature gradient in the tank, the air pump 42 can thus also be used to push the liquid 1 out of the tank T and via the first fluid path 13, 55, 57, 63 to the beverage preparation unit 47 to prepare a beverage. However, the liquid pump 45 facilitates the liquid delivery and allows for applying high pressure required for beverage preparation such as coffee extraction, e.g., for espresso-style coffee, and can thus be alternatively or additionally used.

Optionally, the third control valve 46 can be opened for a predetermined time (e.g. about 1 second or about 10 ml) to connect the first fluid path 13, 55, 57 and the drainage fluid path 64 to allow unheated liquid to escape into the drip tray 48. The drainage fluid path 64 thus allows for an evacuation of liquid into drip tray 48 which can be useful to divert initial too cold liquid—e.g. liquid 1 which remained in the fluid circuit between two operations of the machine M—into drip tray 48 before the heated liquid 1 is delivered to the beverage preparation unit 47 by switching the third control valve 46 to thus closing the drainage fluid path 64 and opening the first fluid path 63.

Heated liquid can be delivered from the first fluid path 13, 55, 57, 63 to the beverage preparation unit 47. A beverage can be prepared using the heated liquid 1 and dispensing the prepared beverage such as (but not limited to) in a container 49. Finally, the air pump 42 and the liquid pump 45 can be switched off and the first fluid path 57 can be closed to the beverage preparation unit 47 and the third fluid path 56 can be opened via the first control valve 43.

At the end of the process, the preparation of the beverage is stopped or terminated by switching off the liquid pump 45 as well as the air pump 42, opening the third fluid path 56 and closing the first fluid path 57 to the beverage preparation unit 47. As the fluid connectors 38, 39 are now physically linked, the remaining liquid in the fluid circuit flows back into the tank T due to pressure equilibrium. This significantly reduces temperature losses in the tank T since no cooling liquid column remains in/through the lid 3.

As will be apparent from the following description of FIGS. 7 to 11, the fluid circuit can be laid out in many different ways while the embodiments as described herein are only considered to be exemplary embodiments.

Figure 6A:
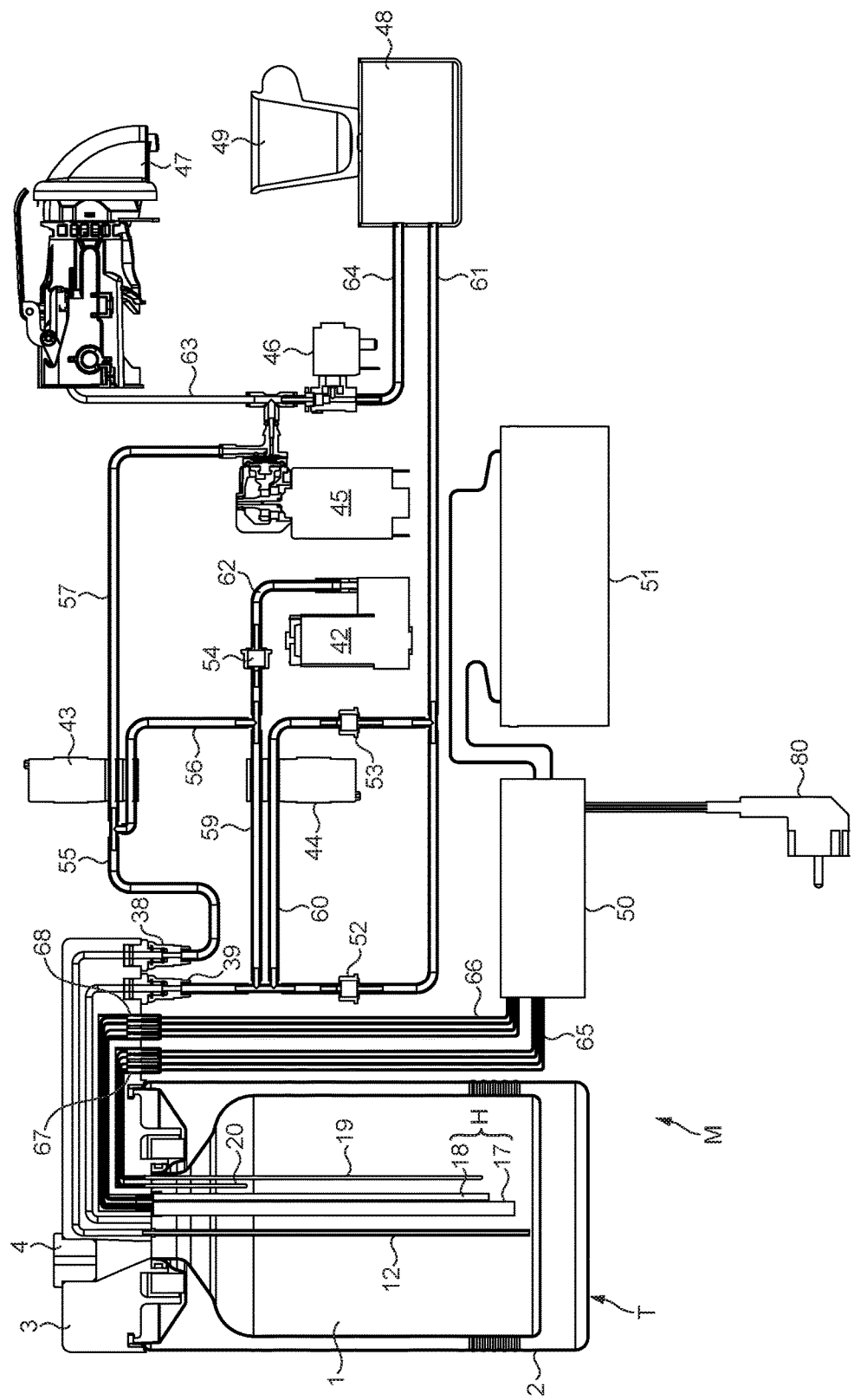
FIG. 6 (a-b) shows a liquid heating system according to a second embodiment of the present disclosure having a mobile liquid tank according to FIG. 1.
Figure 6B:
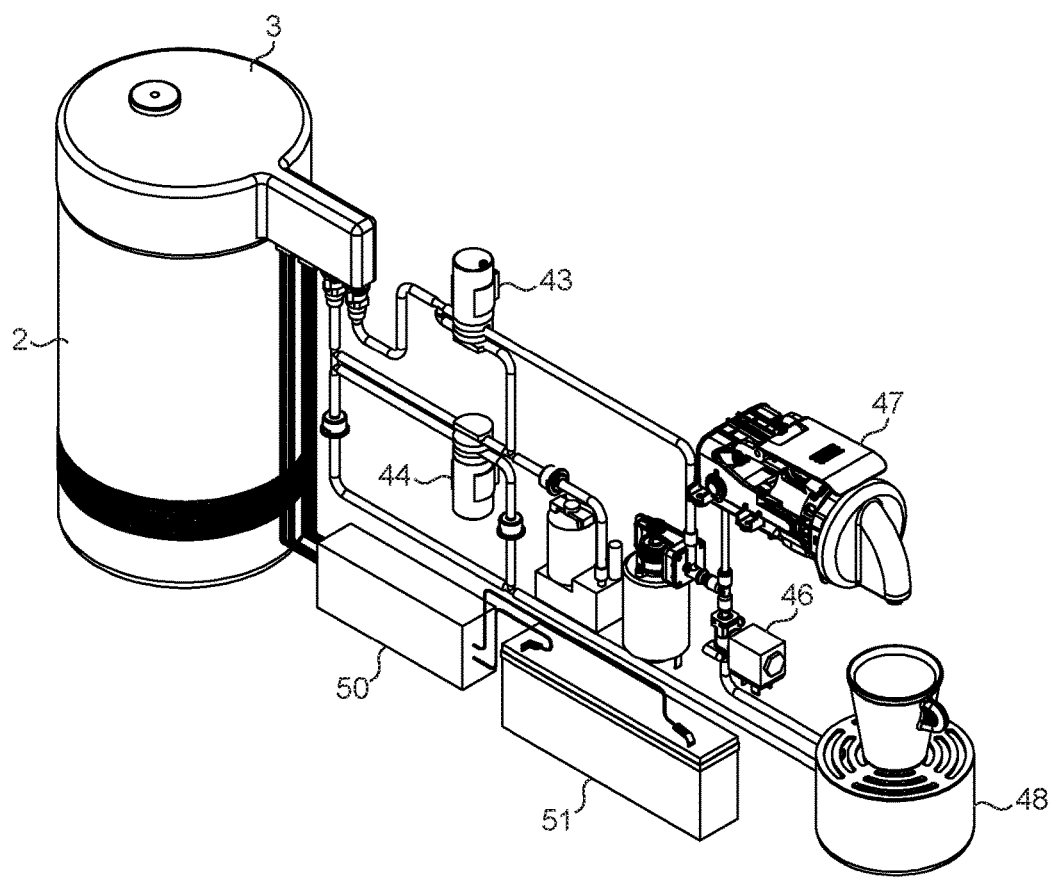
Figure 7A:
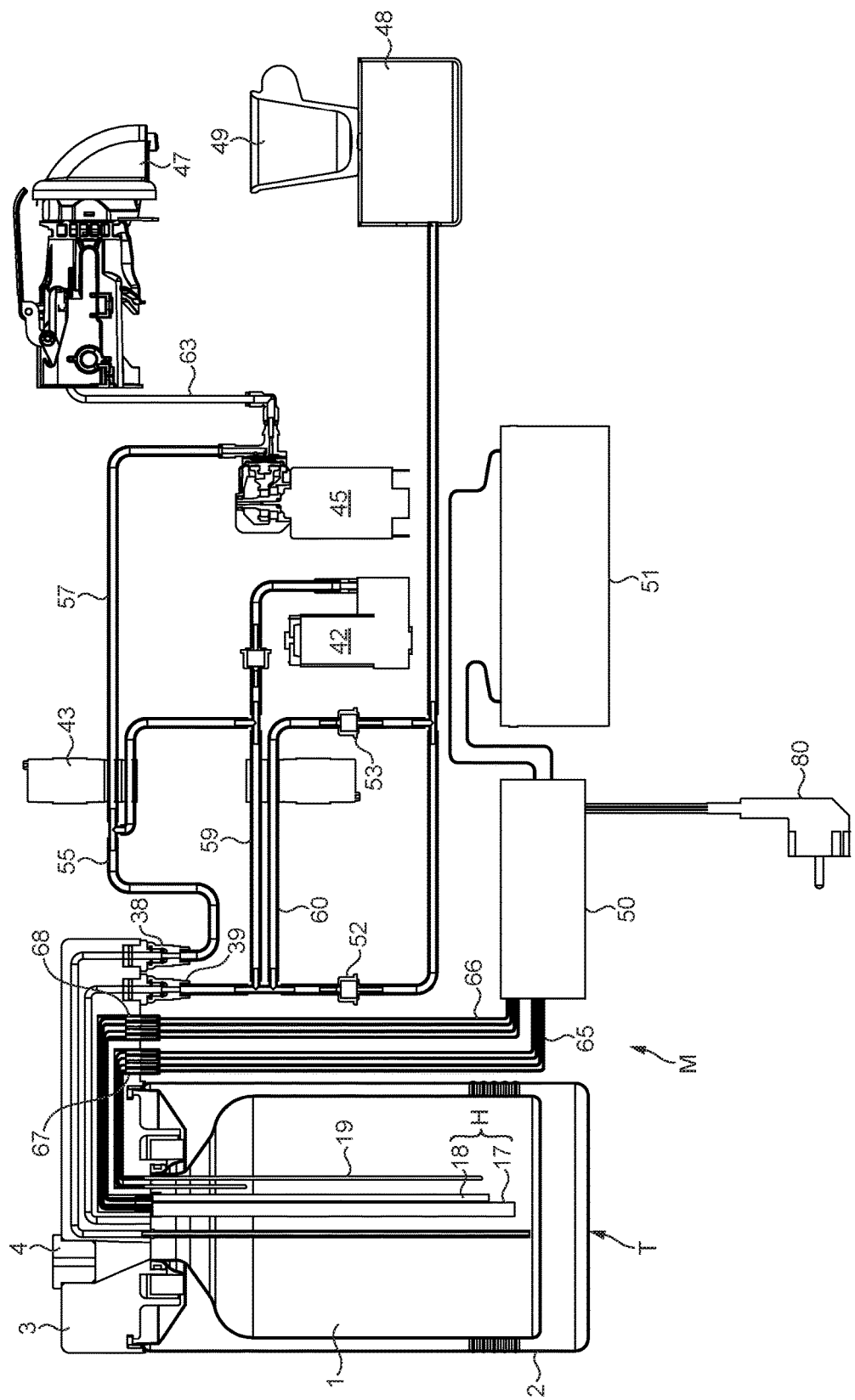
FIG. 7 (a-b) shows a liquid heating system according to a third embodiment of the present disclosure.
Figure 7B:
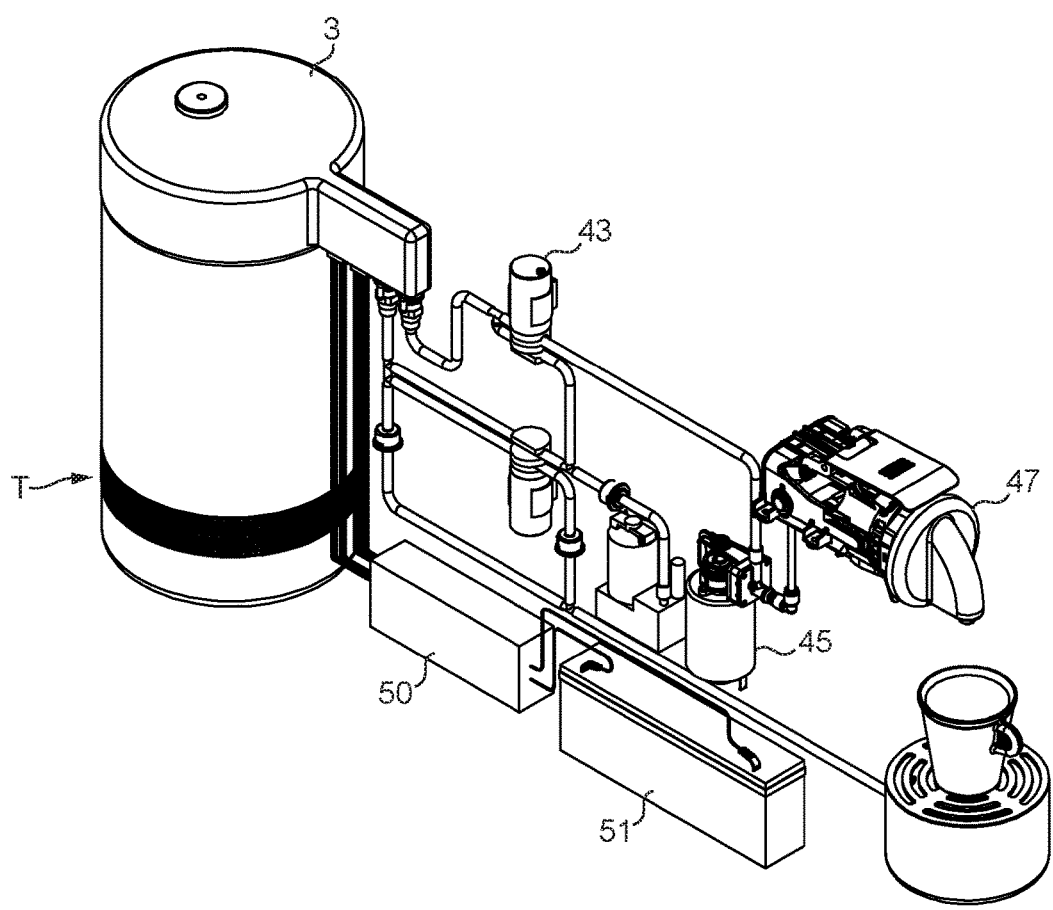

FIG. 7 shows another embodiment of the mobile beverage dispensing machine M which is similar to the machine M according to FIG. 6 but without the control valve 46 and drainage 64. Such a machine M can be used if the initial beverage preparation temperature is less sensitive or the fluid circuit (e.g. the first fluid path 57) are very short so that an effect of a potential unheated liquid with respect to the overall amount of the dispensed beverage is negligible.

Figure 8A:
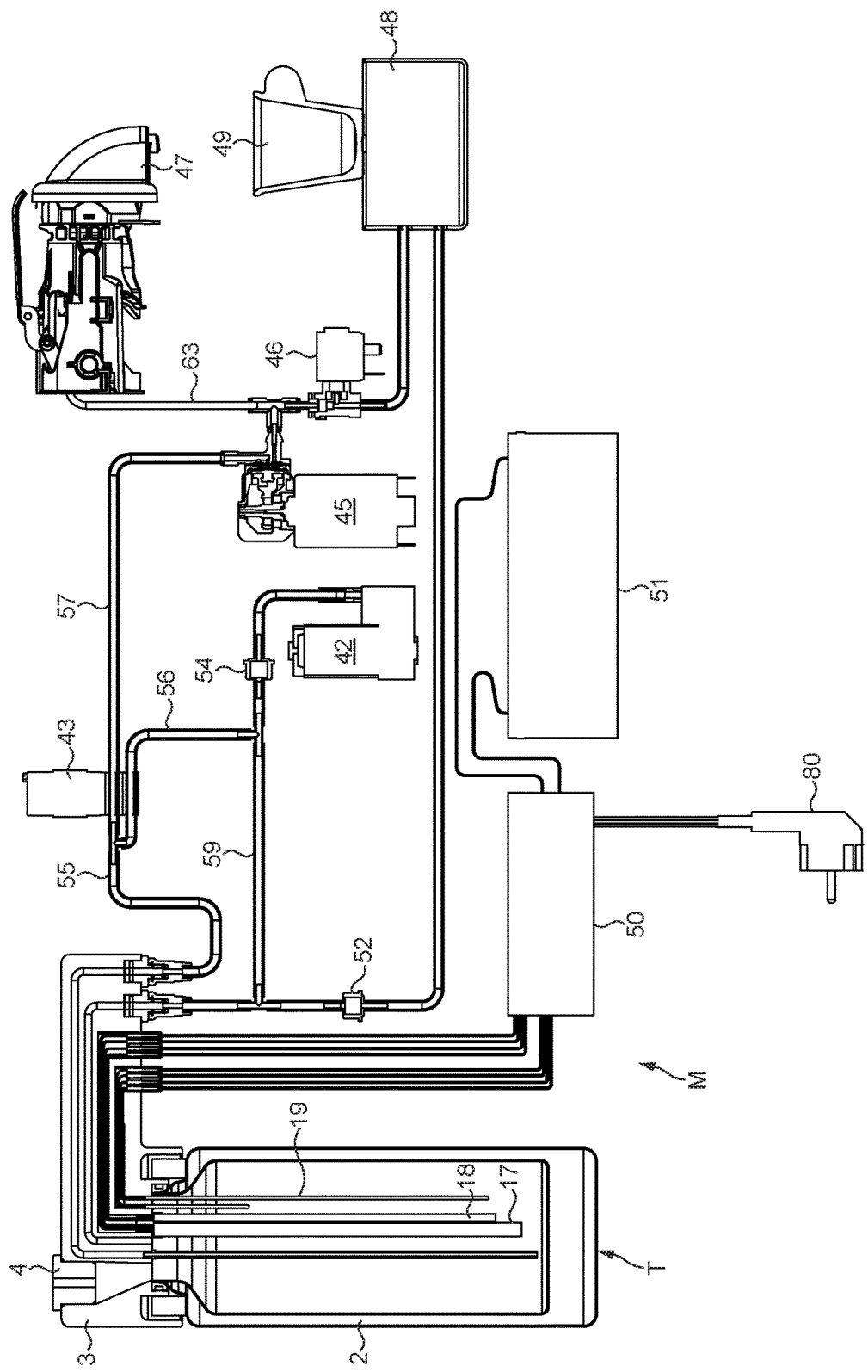
FIG. 8 (a-b) shows a liquid heating system according to a fourth embodiment of the present disclosure and having a mobile liquid tank according to FIG. 2.
Figure 8B:
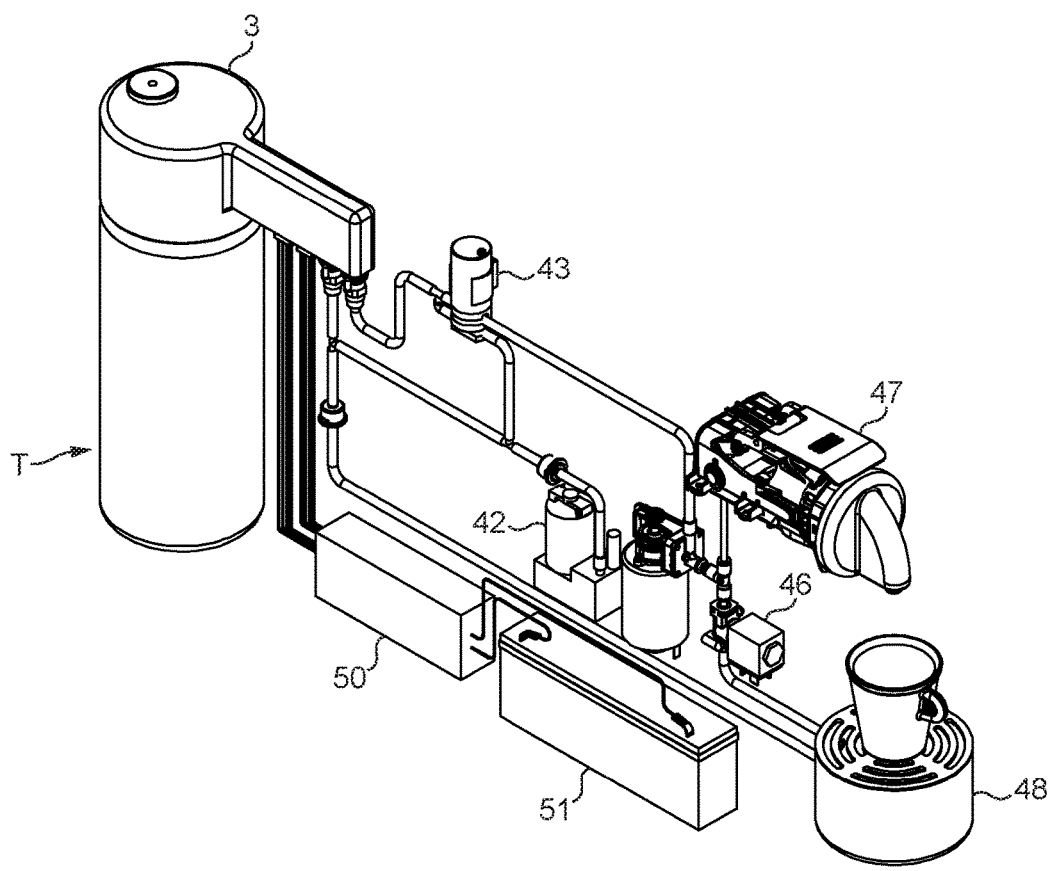

FIG. 8 shows a machine M having, for instance, a smaller tank T as also depicted in FIG. 2. In case of small tanks T (e.g. below one liter) an air liquid mixing in the tank T during the main heating using the heating means H (the first heating element 17) and external power source is not necessarily required so that in this case control valve 44, check valve 53 as well as the fourth fluid path 60 are not needed and can thus be omitted. In certain non-limiting embodiments, the shown tank T (see also FIG. 2) as well as the tank T according to FIGS. 1 and 6 are aimed to be stationary on the mobile machine M so that there is no need for integrating the mobile power source 7 and electronic pack 8 to 11, 21, 22 as these features are integrated in the mobile machine M such as (but not limited to) at its bottom. Therefore, in certain non-limiting embodiments, the electrical connections for the heating means H and the sensor means 19, 20 are made by the electrical connectors 25, 26.

Figure 9A:
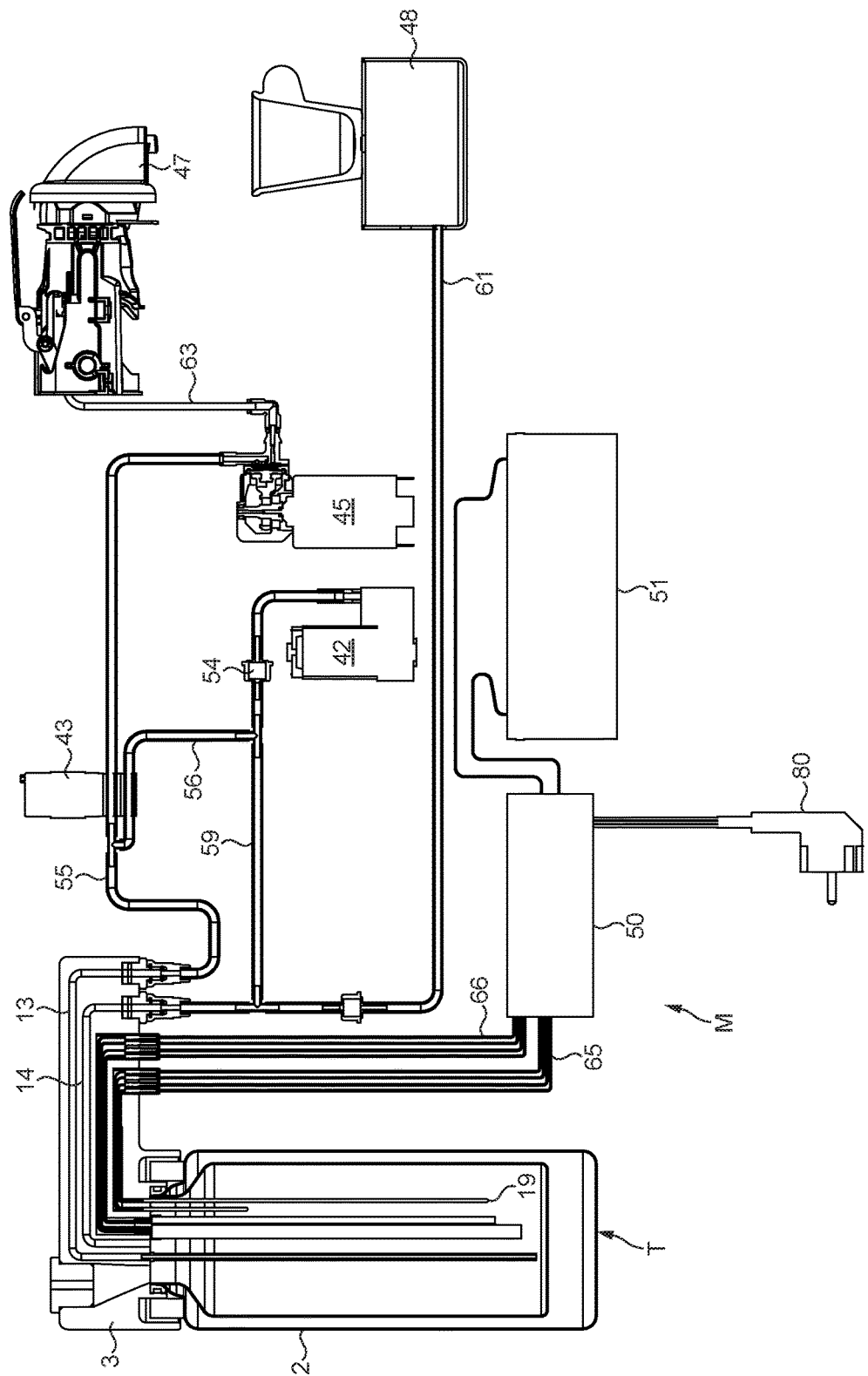
FIG. 9 (a-b) comprises a liquid heating system according to a fifth embodiment of the present disclosure.
Figure 9B:
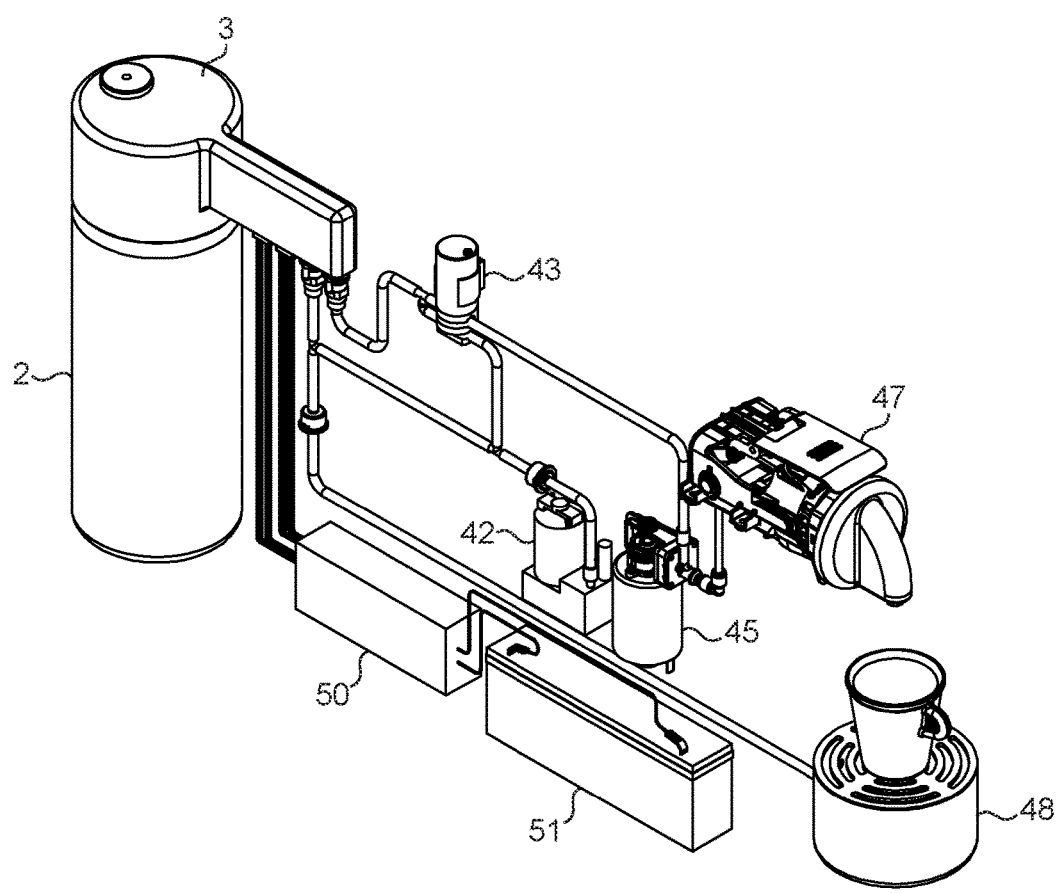

In FIG. 9, a machine like the machine M of FIG. 8 is shown but without control valve 46 and drainage fluid path 64. As already noted above, such a layout is used if the initial extraction temperature is less sensitive or if the length of the fluid circuit, particularly the first fluid path 57, is short.

FIG. 10 shows an embodiment of the machine M similar to FIG. 8 while using a tank T with an independent temperature control as, for instance, described with respect to FIG. 3 of the present disclosure. According to this embodiment, the function of controlling the temperature is thus integrated in the mobile liquid tank T. As already described above, such a type of mobile liquid tank T is aimed to be electrically charged (i.e. the mobile power source 7), filled (i.e. the inside of the tank body 2 with a liquid 1) and heated up (i.e. the liquid 1 inside the tank T) on a separate docking station D as, for instance, depicted in FIGS. 4 and 5 of the present disclosure. As a consequence, the system can be simplified and in particular when having the air-liquid-mixing system being provided in the docking station D as shown in FIGS. 4 and 5, an additional air-liquid-mixing system is not required on the machine M so that the control valve 44 and the fourth fluid path 60 including the check valve 53 can be omitted. This embodiment allows for a quick exchange of empty tanks T by tanks T already containing preheated liquid 1 while not being dependent on the battery charging of the machine M as the liquid temperature control can be powered by a separate mobile power source 7 rather than the mobile power source 51 of the machine M.

Finally, FIG. 11 shows an embodiment similar to FIG. 10 but without the control valve 46 and drainage fluid path 64 used in case the extraction temperature is less sensitive or the length of the fluid circuit, particularly the first fluid path 57, is short.

The tank T of the present disclosure can thus be filled and heated up either on a separate docking station D, desirably (but not by way of limitation) also serving as mobile power source (e.g. battery) charger, or on/in a mobile machine M itself, supposing that the mobile machine M can be plugged to main power (i.e. external power source) for the heating and battery charging processes. A tank T paired with a docking station would, in certain particular (but non-limiting) embodiments, integrate its own mobile power source 7 for an independent temperature control, whereas a tank T paired with a mobile machine M would not necessarily need its own mobile power source 7 but could simply use the mobile power source 51 of the mobile machine M.

The liquid heating system of the present disclosure, in particular a tank T paired with a mobile machine M, can be part of a trolley for servicing beverages in a mobile fashion such as in offices, hotels or meeting rooms. It can also be installed in other vehicles such as tricycles, buses, trains, cars, boats, planes, space vehicles and the like.

Example:

The following part describes, in relation to FIG. 6a, a particular (but non-limiting) example of a method of preparing a beverage using the mobile beverage machine of the present disclosure.

1. The thermo-flask T is initially filled with water and fluidly connected to the machine and the machine is plugged to mains power supply:

a. The tube 56 is opened, tube 57 is closed using control valve 43 and tube 60 is opened and tube 59 is closed using control valve 44.
   b. The main heater 17 is switched on via connectors 65, 67
   c. The air pump 42 is switched on, pushing air through tubes 56, 55 and connector 38 into the thermo-flask T thereby allowing a better temperature homogenization during liquid heating in the thermo-flask. The overpressure is going through connector 39, tube 60 and check valve 53 which is opening at 0 bar overpressure.
   d. Once suitable liquid temperature is reached, the main heater 17 is stopped, control valve 44 closes tube 60, opens tube 59, and check valve 52 on tube 61 leading to drain tray 48 is regulating potential overpressure, around 1.8 bar.

2. Thermos flask liquid T is now ready for supplying liquid to preparation unit 47.

3. The tubes 56, 59 are opened, tubes 57 and 60 are closed, using the control valves 43 and 44, and air pump 42 is started in order to create overpressure in flask.

4. Then, the control valve 43 is switched to close tube 56 and open tube 57, and liquid high pressure pump 45 is started, air pump continues pressurizing flask over tube 59 and connector 39. Liquid is pushed out of flask through tube 12, connector 38, tubes 55, 57 to pump 45 and valve 46 further to drip tray 48 during a short period (typically 1 second or 10 ml), in order to evacuate too cold liquid.

Valve 46 is closed in order to divert liquid through tube 63 to beverage preparation unit 47 to start extraction. Extraction is stopped by switching off high pressure pump 45, switching off air pump 42, opening tube 46 and closing tube 57 by control valve 43. The connectors 39 and 38 are now fluidly linked, allowing the remaining liquid to flow back into the thermos-flask by pressure equilibrium. This reduces significantly the temperature losses in the flask, as no liquid column is remaining through the lid.

The present disclosure is not limited by the embodiments as described herein above. In particular, the features of the respective embodiments can be combined in any possible way as long as being covered by the dependent claims. It is further noted that according to the present disclosure, (closing) a connection between two features usually means a direct (such as (but not limited to) shortest) connection between these features via the mentioned fluid paths within the fluid circuit; i.e. (exclusively) via respective fluid paths.

The invention claimed is:

1. A mobile beverage dispensing machine, comprising:
   a liquid tank having an insulated tank body for receiving and storing a liquid used for preparing a beverage;
   a beverage preparation unit for preparing a beverage using the liquid and dispensing the prepared beverage;
   a fluid circuit for delivering the liquid from the tank to the beverage preparation unit, wherein the fluid circuit comprises:
      a first fluid path fluidly connecting the tank with the beverage preparation unit;
      a second fluid path fluidly connecting the tank with ambient air at a certain overpressure above atmospheric pressure in the tank;
      an air pump; and
      at least one control unit configured for actuating the air pump to fill air inside the tank; and
      wherein the first fluid path and the second fluid path are connected with a third fluid path;

heating means for heating the liquid in the tank;
at least one main power supply connector connectable to an external power source and at least one mobile power source;
at least one control unit configured to:
control and operate at least part of the heating means by external power to heat up the liquid in the tank when the machine is supplied in electrical power by the main power supply connector connected to an external power source; and
control and operate at least part of the heating means by power of the mobile power source to keep heating liquid in the tank when the machine is no longer supplied in electrical power from the at least one main power supply connector; and
a first control valve activated by the control unit to fluidly connect the air pump to a first portion of the first fluid path.

2. The mobile beverage dispensing machine according to claim 1, wherein the fluid circuit further comprises a fourth fluid path bypassing the first check valve of the second fluid path, wherein the fourth fluid path comprises a second check valve opening at a second calibrated pressure below the calibrated pressure of the first check valve, and wherein the fluid circuit further comprises a second control valve controlled by the control unit for selectively closing the third fluid path or fourth fluid path.

3. The mobile beverage dispensing machine according to claim 2, wherein the second calibrated pressure is below 1 bar.

4. The mobile beverage dispensing machine according to claim 2, wherein a liquid pump is provided in the fluid circuit in the first fluid path for pumping liquid from the tank to the beverage preparation unit.

5. The mobile beverage dispensing machine according to claim 4, wherein the liquid pump is provided between the first control valve and the beverage preparation unit, and wherein the liquid pump is controlled by the control unit.

6. The mobile beverage dispensing machine according to claim 4, wherein the fluid circuit further comprises a third control valve wherein the third control valve is positioned downstream the liquid pump in the first fluid path for selectively opening or closing a drainage fluid path.

7. The mobile beverage dispensing machine according to claim 6, wherein the third control valve is controlled by the control unit.

8. The mobile beverage dispensing machine according to claim 6, wherein the second fluid path and/or the drainage fluid path are fluidly connected to a drip tray placed below the beverage preparation unit.

9. A method for preparing a beverage using the mobile beverage dispensing machine according to claim 1, the method comprising the steps of:
controlling and operating at least part of the heating means by external power to heat up the liquid in the tank as the machine is supplied in electrical power by the main power supply connector connected to an external power source; and
controlling and operating at least part of the heating means by power of the mobile power source to keep heating liquid in the tank as the machine is stopped being supplied in electrical power from the at least one main power supply connector.

10. A mobile beverage dispensing machine, comprising:
a liquid tank having an insulated tank body for receiving and storing a liquid used for preparing a beverage;
a beverage preparation unit for preparing a beverage using the liquid and dispensing the prepared beverage;
a fluid circuit for delivering the liquid from the tank to the beverage preparation unit, wherein the fluid circuit comprises:
a first fluid path fluidly connecting the tank with the beverage preparation unit;
a second fluid path fluidly connecting the tank with ambient air at a certain overpressure above atmospheric pressure in the tank, wherein the second fluid path comprises a check valve opening at a calibrated pressure value above atmospheric pressure;
an air pump; and
at least one control unit configured for actuating the air pump to fill air inside the tank;
heating means for heating the liquid in the tank;
at least one main power supply connector connectable to an external power source and at least one mobile power source;
at least one control unit configured to:
control and operate at least part of the heating means by external power to heat up the liquid in the tank when the machine is supplied in electrical power by the main power supply connector connected to an external power source; and
control and operate at least part of the heating means by power of the mobile power source to keep heating liquid in the tank when the machine is no longer supplied in electrical power from the at least one main power supply connector; and
a first control valve activated by the control unit to fluidly connect the air pump to a first portion of the first fluid path.

11. The mobile beverage dispensing machine according to claim 10, wherein the heating means comprise a first heating element and a second heating element, wherein the first heating element is connectable or connected to the main power supply connector and the second heating element is connectable or connected to the at least one mobile power source.

12. The mobile beverage dispensing machine according to claim 10, further comprising temperature control sensor means being provided in the tank, wherein the temperature control sensor means are connected to the control unit and the measured temperature data received from the temperature control sensor means is used as input for controlling the heating means.

13. The mobile beverage dispensing machine according to claim 10, wherein the tank is releasably provided in the machine, wherein the tank comprises fluid connectors for fluidly connecting the tank with the fluid circuit and comprises electrical connectors for electrically connecting the heating means with the main power supply connector and with the mobile power source via the control unit.

14. A method for preparing a beverage using the mobile beverage dispensing machine according to claim 10, the method comprising the steps of:
controlling and operating at least part of the heating means by external power to heat up the liquid in the tank as the machine is supplied in electrical power by the main power supply connector connected to an external power source; and
controlling and operating at least part of the heating means by power of the mobile power source to keep heating liquid in the tank as the machine is stopped being supplied in electrical power from the at least one main power supply connector.

15. A mobile beverage dispensing machine, comprising:

a liquid tank having an insulated tank body for receiving and storing a liquid used for preparing a beverage, wherein the tank comprises a lid for selectively covering the tank body;

a beverage preparation unit for preparing a beverage using the liquid and dispensing the prepared beverage;

a fluid circuit for delivering the liquid from the tank to the beverage preparation unit, wherein the fluid circuit comprises:

a first fluid path fluidly connecting the tank with the beverage preparation unit;

an air pump; and at least one control unit configured for actuating the air pump to fill air inside the tank;

heating means for heating the liquid in the tank;

at least one main power supply connector connectable to an external power source and at least one mobile power source;

at least one control unit configured to:

control and operate at least part of the heating means by external power to heat up the liquid in the tank when the machine is supplied in electrical power by the main power supply connector connected to an external power source; and control and operate at least part of the heating means by power of the mobile power source to keep heating liquid in the tank when the machine is no longer supplied in electrical power from the at least one main power supply connector; and a first control valve activated by the control unit to fluidly connect the air pump to a first portion of the first fluid path; and wherein the heating means and/or part of the fluid circuit are provided within the lid.

16. The mobile beverage dispensing machine according to claim 15, wherein the heating means comprise a first heating element and a second heating element, wherein the first heating element is connectable or connected to the main power supply connector and the second heating element is connectable or connected to the at least one mobile power source.

17. The mobile beverage dispensing machine according to claim 15, further comprising temperature control sensor means being provided in the tank, wherein the temperature control sensor means are connected to the control unit and the measured temperature data received from the temperature control sensor means is used as input for controlling the heating means.

18. The mobile beverage dispensing machine according to claim 15, wherein the tank is releasably provided in the machine, wherein the tank comprises fluid connectors for fluidly connecting the tank with the fluid circuit and comprises electrical connectors for electrically connecting the heating means with the main power supply connector and with the mobile power source via the control unit.

19. A method for preparing a beverage using the mobile beverage dispensing machine according to claim 15, the method comprising the steps of:

controlling and operating at least part of the heating means by external power to heat up the liquid in the tank as the machine is supplied in electrical power by the main power supply connector connected to an external power source; and controlling and operating at least part of the heating means by power of the mobile power source to keep heating liquid in the tank as the machine is stopped being supplied in electrical power from the at least one main power supply connector.

\* \* \* \* \*